United States Patent
Kim et al.

(10) Patent No.: US 11,579,723 B2
(45) Date of Patent: Feb. 14, 2023

(54) TOUCH APPARATUS AND TOUCH DETECTION METHOD THEREOF

(71) Applicant: HiDeep Inc., Seongnam-si (KR)

(72) Inventors: Seyeob Kim, Seongnam-si (KR);
Bonkee Kim, Seongnam-si (KR)

(73) Assignee: HIDEEP INC., Seongnam-si (KR)

( * ) Notice: Subject to any disclaimer, the term of this patent is extended or adjusted under 35 U.S.C. 154(b) by 105 days.

(21) Appl. No.: 17/253,296

(22) PCT Filed: Jun. 10, 2019

(86) PCT No.: PCT/KR2019/006943
§ 371 (c)(1),
(2) Date: Dec. 17, 2020

(87) PCT Pub. No.: WO2020/013453
PCT Pub. Date: Jan. 16, 2020

(65) Prior Publication Data
US 2021/0263631 A1    Aug. 26, 2021

(30) Foreign Application Priority Data

Jul. 9, 2018  (KR) .......................... 10-2018-0079420
Oct. 4, 2018  (KR) .......................... 10-2018-0118367

(51) Int. Cl.
*G06F 3/041*    (2006.01)
*G06F 3/0354*   (2013.01)
*G06F 3/044*    (2006.01)

(52) U.S. Cl.
CPC ...... *G06F 3/04162* (2019.05); *G06F 3/03545* (2013.01); *G06F 3/04166* (2019.05); *G06F 3/0446* (2019.05)

(58) Field of Classification Search
CPC ............ G06F 3/04162; G06F 3/03545; G06F 3/04166; G06F 3/0446; G06F 2203/04106
See application file for complete search history.

(56) References Cited

U.S. PATENT DOCUMENTS

2013/0300708 A1*  11/2013  Kim ...................... G06F 3/0447
                                                345/174
2016/0147320 A1*  5/2016  Krumpelman ...... G06F 3/04166
                                                345/179

(Continued)

FOREIGN PATENT DOCUMENTS

JP    2015-079487      4/2015
KR    10-2015-0129960  11/2015

(Continued)

OTHER PUBLICATIONS

KIPO, PCT Search Report & Written Opinion of PCT/KR2019/006943 dated Sep. 19, 2019.

*Primary Examiner* — Temesghen Ghebretinsae
*Assistant Examiner* — Ivelisse Martinez Quiles
(74) *Attorney, Agent, or Firm* — Lex IP Meister, PLLC

(57) ABSTRACT

A touch apparatus according to an exemplary embodiment of the present invention includes: a touch sensor; and a touch controller that operates in a resonance driving mode during which a first driving signal is output for generation of a resonance signal of a stylus pen to the touch sensor and an idle mode during which the driving signal output to the touch sensor is stopped, and obtains first touch coordinate information from a detection signal input from the touch sensor during the resonance driving mode.

32 Claims, 18 Drawing Sheets

(56) References Cited

U.S. PATENT DOCUMENTS

2019/0196642 A1* 6/2019 Kong ................ G06F 3/041662
2019/0369772 A1* 12/2019 Yun ....................... G06F 3/0445

FOREIGN PATENT DOCUMENTS

| KR | 10-2016-0025440 | 3/2016 |
|---|---|---|
| KR | 10-2016-0095945 | 8/2016 |
| KR | 10-2018-0003816 | 1/2018 |

* cited by examiner

TOUCH APPARATUS AND TOUCH DETECTION METHOD THEREOF

TECHNICAL FIELD

The present disclosure relates to a touch apparatus and a touch detection method of the touch apparatus. More particularly, the present invention relates to a touch apparatus for detecting a touch by a stylus pen, and a touch detection method of the touch apparatus.

BACKGROUND ART

Various terminals such as a mobile phone, a smart phone, a tablet PC, a laptop computer, a digital broadcasting terminal, a personal digital assistant (PDA), a portable multimedia player (PMP), a navigator, and the like are provided with a touch sensor.

In such a terminal, the touch sensor may be located on a display panel where an image is displayed, or may be disposed in one region of a terminal body. As a user interacts with the terminal by touching the touch sensor, the terminal can provide an intuitive user interface to the user.

The user may use a stylus pen for sophisticated touch input. Such a stylus pen can transmit and receive signals through a touch sensor using an electrical and/or magnetic method.

DISCLOSURE

Technical Problem

Exemplary embodiments are intended to provide a touch apparatus and a touch detection method thereof that facilitate signal processing for detecting touch coordinates.

Exemplary embodiments are intended to provide a touch apparatus and a touch detection method thereof to determine the type of a touch object.

Exemplary embodiments are intended to provide a touch apparatus with improved touch detection performance and a touch detection method thereof.

Technical Solution

In order achieve the above-stated or other purpose of the present invention, a touch apparatus according to a first exemplary embodiment of the present invention includes: a touch sensor; and a touch controller that operates in a resonance driving mode during which a first driving signal is output for generation of a resonance signal of a stylus pen to the touch sensor and an idle mode during which the driving signal output to the touch sensor is stopped, and obtains first touch coordinate information from a detection signal input from the touch sensor during the resonance driving mode.

In the touch apparatus according to the first exemplary embodiment, the touch controller obtains an effective signal by using a baseline signal, and the detection signal output from the touch sensor during the resonance driving mode, and obtains the first touch coordinate information from the effective signal.

In the touch apparatus according to the first exemplary embodiment, the touch controller may determine a type of a touch object that generated a touch input by using the effective signal.

In the touch apparatus according to the first exemplary embodiment, the touch controller may recognize the touch object as the stylus pen when the effective signal is a signal that corresponds to a resonance signal of the stylus pen.

In the touch apparatus according to the first exemplary embodiment, when a touch input with respect to the touch sensor is detected, the touch controller may determine a type of a touch object that generated the touch input from the detection signal input from the touch sensor during the idle mode.

In the touch apparatus according to the first exemplary embodiment, a frequency of the first driving signal may correspond to a resonance frequency of the stylus pen.

In the touch apparatus according to the first exemplary embodiment, the touch controller may operate in a normal driving mode during which a second driving signal of which a frequency is different from that of the first driving signal is output to the touch sensor.

In the touch apparatus according to the first exemplary embodiment, the touch controller obtains second touch coordinate information by using a detection signal input from the touch sensor during the normal driving mode.

In the touch apparatus according to the first exemplary embodiment, a frequency of the first driving signal in the resonance driving mode may be different from a frequency of the second driving signal in the normal driving mode.

A touch detection method of a touch apparatus according to a second exemplary embodiment of the present invention includes: entering a resonance driving mode, and outputting a first driving signal for generation a resonance signal of a stylus pen to a touch sensor; receiving a detection signal from the touch sensor during the resonance driving mode; obtaining first touch coordinate information from the detection signal; and entering an idle mode, and stopping outputting of a driving signal with respect to the touch sensor.

In the touch detection method of the touch apparatus according to the second exemplary embodiment of the present invention, the obtaining of the first touch coordinate information may include: obtaining an effective signal by using a baseline signal, and the detection signal received from the touch sensor during the resonance driving mode; and obtaining the first touch coordinate information from the effective signal.

The touch detection method of the touch apparatus according to the second exemplary embodiment of the present invention may further include recognizing a touch object that generated a touch input by using the effective signal.

In the touch detection method of the touch apparatus according to the second exemplary embodiment of the present invention, the recognizing of the touch object may include recognizing the touch object as the stylus pen when the effective signal is a signal corresponding to a resonance signal of the stylus pen.

The touch detection method of the touch apparatus according to the second exemplary embodiment of the present invention may further include, while opening in the idle mode, determining a type of a touch object that generated the touch input from the detection signal received from the touch sensor.

In the touch detection method of the touch apparatus according to the second exemplary embodiment of the present invention, the determining of the type of the touch object while operating in the idle mode may include determining the touch object as the stylus pen when the detection signal input from the touch sensor during the idle mode includes a signal component that corresponds to a resonance signal of the stylus pen.

In the touch detection method of the touch apparatus according to the second exemplary embodiment of the present invention, a frequency of the first driving signal may correspond to a resonance frequency of the stylus pen.

The touch detection method of the touch apparatus according to the second exemplary embodiment of the present invention may further include: operating in a normal driving mode during which a second driving signal of which a frequency is different from the frequency of the first driving signal is output to the touch sensor; and obtaining second touch coordinate information by using a detection signal input from the touch sensor during the normal driving mode.

In the touch detection method of the touch apparatus according to the second exemplary embodiment of the present invention, the first driving signal in the resonance driving mode may have a different frequency from a frequency of the second driving signal in the normal driving mode.

A touch apparatus according to a third exemplary embodiment of the present invention includes: a touch sensor that includes a plurality of first touch electrodes for obtaining a coordinate value in a first coordinate axis, and a plurality of second touch electrodes for obtaining a coordinate value in a second coordinate axis that perpendicularly crosses the first coordinate axis; and a touch controller that operates in a driving mode during which a driving signal for generation of a resonance signal of a stylus pen is output to the touch sensor, and an idle mode during which the outputting of the driving signal is stopped, and obtains touch coordinate information from a detection signal input from the touch sensor during a driving mode section during which the touch controller operates in the driving mode.

In the touch apparatus according to the third exemplary embodiment of the present invention, the touch controller may simultaneously output the driving signal to the plurality of first touch electrodes during a first driving mode section and may simultaneously output the driving signal to the plurality of second touch electrodes during a second driving mode section, which is the next driving mode section of the first driving mode section, and may obtain the touch coordinate information by using a detection signal input from at least one type of touch electrodes among the plurality of first touch electrodes and the plurality of second touch electrodes during the first and second driving mode sections.

In the touch apparatus according to the third exemplary embodiment of the present invention, the touch controller may obtain a coordinate value in the second coordinate axis among the touch coordinate information by using detection signals input from the plurality of second touch electrodes during the first driving mode section, and may obtain a coordinate value in the first coordinate axis among the touch coordinate information by using detection signals input from the plurality of first touch electrodes during the second driving mode section.

In the touch apparatus according to the third exemplary embodiment of the present invention, the touch controller may obtain a coordinate value in the first coordinate axis among the touch coordinate information by using detection signals input from the plurality of first touch electrodes during the first driving mode section, and may obtain a coordinate value in the second coordinate axis among the touch coordinate information by using detection signals input from the plurality of second touch electrodes during the second driving mode section.

In the touch apparatus according to the third exemplary embodiment of the present invention, the touch controller may simultaneously output the driving signal to the plurality of first and second touch electrodes, and obtains the touch coordinate information by using a detection signal input from the plurality of touch electrodes and/or the plurality of second touch electrodes during the driving mode.

In the touch apparatus according to the third exemplary embodiment of the present invention, the touch controller may obtain a coordinate value in the second coordinate axis among the touch coordinate information by using detection signals received from the plurality of second touch electrodes, and may obtain a coordinate value in the first coordinate axis among the touch coordinate information by using detection signals input from the plurality of first touch electrodes during the driving mode section.

In the touch apparatus according to the third exemplary embodiment of the present invention, the touch controller may obtain a coordinate value in the first coordinate axis among the touch coordinate information by using detection signals input from the plurality of first touch electrodes during the first driving mode section, and may obtain a coordinate value in the second coordinate axis among the touch coordinate information by using detection signals input from the plurality of second touch electrodes during a second driving mode section, which is a driving mode section next to the first driving mode section.

In the touch apparatus according to the third exemplary embodiment of the present invention, the touch controller may simultaneously output the driving signal to the plurality of first touch electrodes during the driving mode section and obtains a coordinate value in the second coordinate axis among the touch coordinate information by using detection signals input from the plurality of second touch electrodes during the driving mode, and may obtain a coordinate value in the first coordinate axis among the touch coordinate information by using detection signals input from the plurality of first touch electrodes for an idle mode section during which the touch controller operations in the idle mode, which is consecutive to the driving mode section.

In the touch apparatus according to the third exemplary embodiment of the present invention, the touch controller may determine a type of a touch object that generated the touch input by using a detection signal received from the touch sensor while operating in the idle mode.

In addition, a touch apparatus according to a fourth exemplar embodiment of the present invention includes: a touch sensor that includes a plurality of touch electrodes that are arranged in a dot matrix format; and a touch controller that operates in a driving mode during which a driving signal for generation of a resonance signal of a stylus pen is output to the plurality of touch sensors, and obtains touch coordinate information from a detection signal input from the touch sensor during a driving mode section during which the touch controller operates in the driving mode.

In addition, according to a fifth exemplary embodiment of the present invention provides a touch detection method of a touch apparatus that is provided with a touch sensor that includes a plurality of first touch electrodes for obtaining a coordinate value in a first coordinate axis and a plurality of second touch electrodes for obtaining a coordinate value in a second coordinate axis that perpendicularly crosses the first coordinate axis, is provided. The touch detection method includes: entering a first driving mode section, and simultaneously outputting a driving signal for generation of a resonance signal of a stylus pen to the plurality of first touch electrodes; obtaining a first coordinate value that constitutes touch coordinate information by using a detection signal input from at least one type of touch electrode among the plurality of first touch electrodes and the plurality of second touch electrodes during the first driving mode section; entering a second driving mode section, and simultaneously outputting the driving signal to the plurality of second touch electrodes; and obtaining a second coordinate value that constitutes the touch coordinate information by using a detection signal input from the plurality of first touch electrodes and/or the plurality of second touch electrodes during the second driving mode section.

In the touch detection method according to the fifth exemplary embodiment, the obtaining the first coordinate value comprises obtaining the first coordinate value in the second coordinate axis among the touch coordinate information by using detection signals input from the plurality of second touch electrodes, and the obtaining the second coordinate value comprises obtaining the second coordinate value in the first coordinate axis among the touch coordinate information by using detection signals input from the plurality of first touch electrodes.

In the touch detection method according to the fifth exemplary embodiment, the obtaining the first coordinate value comprises obtaining the first coordinate value in the first coordinate axis among the touch coordinate information by using detection signals input from the plurality of first touch electrodes, and the obtaining the second coordinate value comprises obtaining the second coordinate value in the second coordinate axis among the touch coordinate information by using detection signals input from the plurality of second touch electrodes.

The touch detection method according to the fifth exemplary embodiment may further include: when entering an idle mode section after termination of the first driving mode section, disabling outputting of the driving signal; and determining a type of a touch object that generated the touch input by using a detection signal received from the plurality of first touch electrodes or the plurality of second touch electrodes during the idle mode section.

In addition, according to a sixth exemplary embodiment of the present invention, a touch detection method of a touch apparatus provided with a touch sensor that includes a plurality of first touch electrodes for obtaining a coordinate value in a first coordinate axis, and a plurality of second touch electrodes for obtaining a coordinate value in a second coordinate axis that perpendicularly crosses the first coordinate axis, is provided. The touch detection method includes: entering a driving mode section, and simultaneously outputting a driving signal for generation of a resonance signal of a stylus pen to the plurality of first and second touch electrode; and obtaining the touch coordinate information by using a detection signal input from at least one type of touch electrode among the plurality of first touch electrodes and the plurality of second touch electrodes during the driving mode section.

In the touch detection method according to the sixth exemplary embodiment, the obtaining the touch coordinate information may include: obtaining a coordinate value in the second coordinate axis among the touch coordinate information by using detection signals received from the plurality of second touch electrodes during the driving mode section; and obtaining a coordinate value in the first coordinate axis among the touch coordinate information by using detection signals received from the plurality of first touch electrodes during the driving mode section.

In the touch detection method according to the sixth exemplary embodiment, the obtaining the touch coordinate information may include: obtaining a coordinate value in the first coordinate axis among the touch coordinate information by using detection signals received from the plurality of first touch electrodes when the driving mode section is a first driving mode section; and obtaining a coordinate value in the second coordinate axis among the touch coordinate information by using detection signals received from the plurality of second touch electrodes when the driving mode section is a second driving mode section.

In the touch detection method according to the sixth exemplary embodiment, the obtaining the touch coordinate information may include: obtaining a coordinate value in the first coordinate axis among the touch coordinate information by using detection signals received from the plurality of first touch electrodes during the driving mode section, and the touch detection method may further include, when entering an idle mode during which an output of the driving signal is disabled, obtaining a coordinate value in the second coordinate axis among the touch coordinate information by using detection signals received from the plurality of second touch electrodes when the driving mode section is a second driving mode section.

The touch detection method according to the sixth exemplary embodiment may further include: when entering an idle mode section after termination of the driving mode section, disabling outputting of the driving signal; and determining a type of a touch object that generated the touch input by using a detection signal received from the plurality of first touch electrodes or the plurality of second touch electrodes during the idle mode section.

Advantageous Effects

The touch apparatus and the touch detection method thereof according to the present disclosure may improve touch detection performance by increasing intensity of a resonance signal generated from a resonance stylus pen.

In addition, the touch apparatus and the touch detection method thereof according to the present disclosure improve the signal-to-noise ratio (SNR) of an effective signal used for detecting touch coordinates, and secure sufficient touch signal processing time.

In addition, the touch apparatus and the touch detection method thereof according to the present disclosure can promptly determine a type of a touch object.

MODE FOR INVENTION

Figure 1:
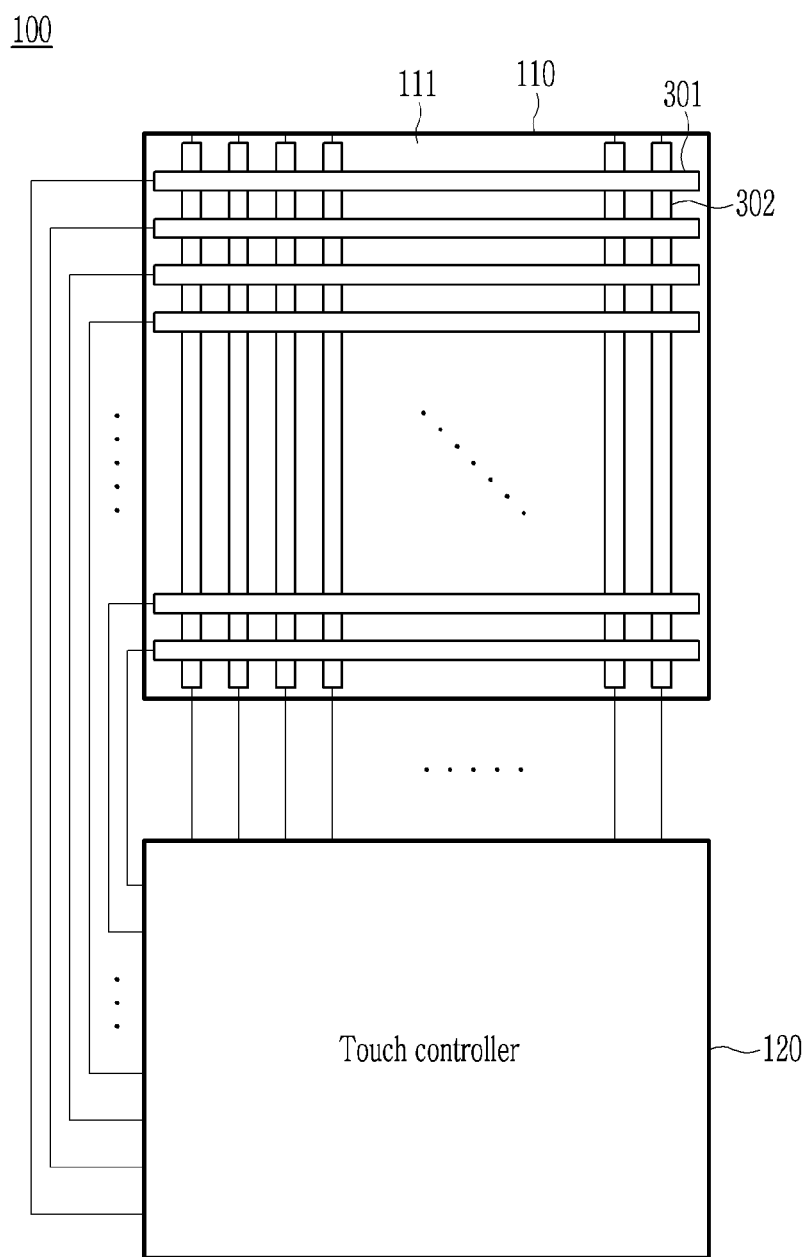
FIG. 1 schematically illustrates a touch apparatus according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

In addition, unless explicitly described to the contrary, the word "comprise" and variations such as "comprises" or "comprising" will be understood to imply the inclusion of stated elements but not the exclusion of any other elements.

Hereinafter, a touch apparatus and a touch detection method of the touch apparatus according to exemplary embodiments will be described with reference to the accompanying drawings.

Figure 2:
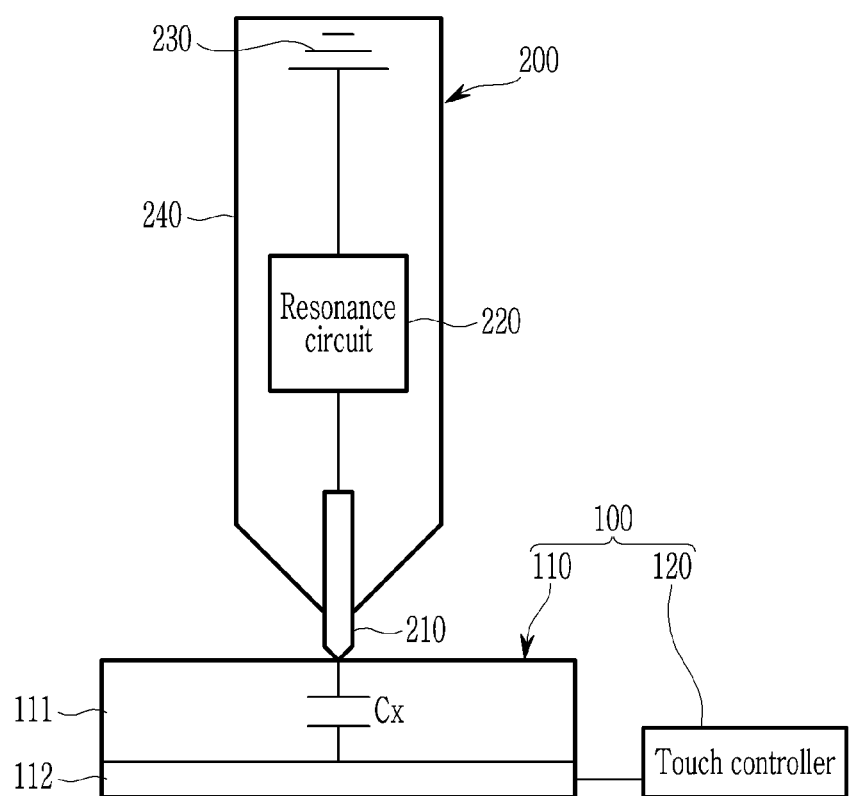
FIG. 2 illustrates an example of touch input detection of a stylus pen of the touch apparatus according to the exemplary embodiment of the present invention.
Figure 3:
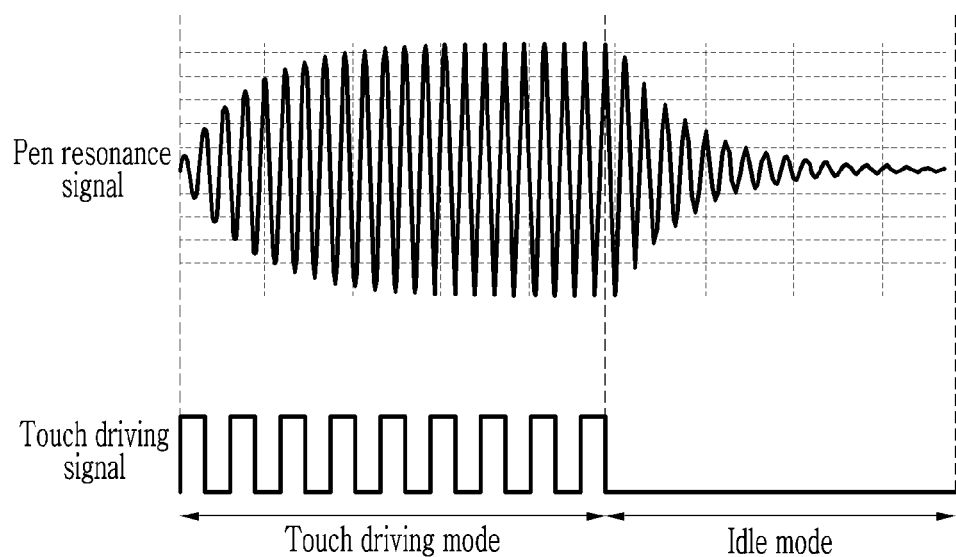
FIG. 3 is provided for description of generation of a resonance signal of the stylus pen of FIG. 2.
Figure 4:
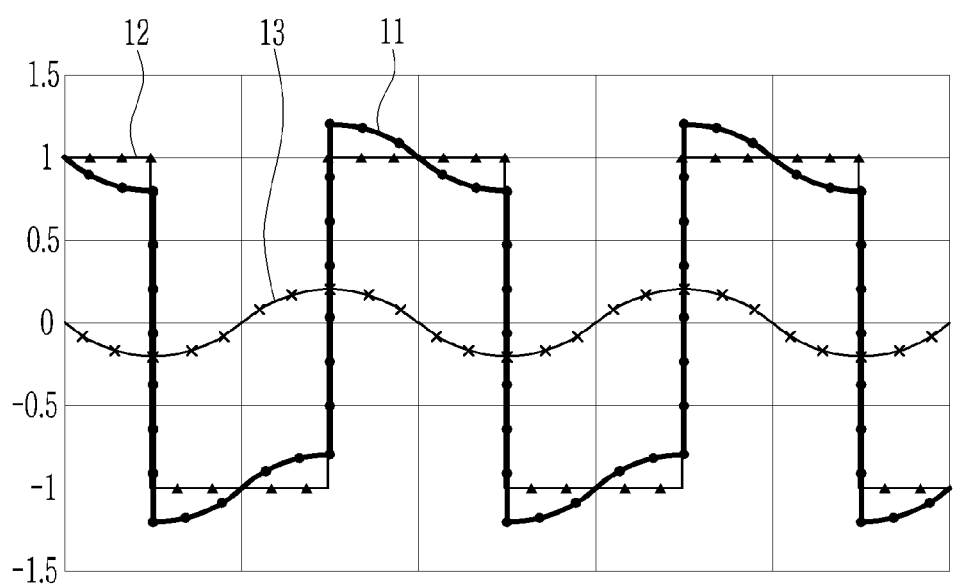
FIG. 4 is provided for description of a touch coordinate information acquisition method of the touch apparatus according to the exemplary embodiment of the present invention.

FIG. 1 schematically illustrates a touch apparatus according to an exemplary embodiment of the present invention, and FIG. 2 illustrates an example of touch input detection of a stylus pen of the touch apparatus according to the exemplary embodiment of the present invention. FIG. 3 is provided for description of generation of a resonance signal of the stylus pen of FIG. 2, and FIG. 4 is provided for description of a touch coordinate information acquisition method of the touch apparatus according to the exemplary embodiment of the present invention.

Referring to FIG. 1 and FIG. 2, a touch apparatus 100 may include a touch panel 110 and a touch controller 120.

The touch panel 110 may include a substrate 111 and a touch sensor 112 that is disposed on the substrate 111.

The touch sensor 112 may be used to detect a touch input (direct touch or proximity touch) by a touch object. The touch sensor 112 operates by receiving a driving signal from the touch controller 120, and may output a detection signal corresponding to a touch detection result to the touch controller 120.

The stylus pen 200 generates a resonance signal responding to the driving signal applied to the touch sensor 112, and the touch sensor 112 may detect a touch by detecting the resonance signal generated by the stylus pen 200.

For example, in FIG. 2, the stylus pen 200 may operate in an electrically coupled resonance (ECR) method. The ECR-type stylus pen 200 may include a conductive tip 210, a resonance circuit 220, a ground 230, and a body 240.

The conductive tip 210 is at least partially formed of a conductive material (e.g., metal, conductive rubber, conductive fabric, conductive silicone, etc.), and may be electrically connected to the resonance circuit 220.

The resonance circuit 220 is an LC resonance circuit, and may resonant with the driving signal received from the touch sensor 112 of the touch apparatus 100. A resonance signal (hereinafter, referred to as "pen resonance signal") generated by the resonance circuit 220 resonating with the driving signal of the touch sensor 112 may be output to the touch sensor 112 through the conductive tip 210. As shown in FIG. 3, the resonance circuit 220 may output a pen resonance signal due to resonance through the conductive tip 210 in a section in which a driving signal is input from the touch sensor 112 and some sections thereafter. The resonance circuit 220 is disposed in the body 240, and may be electrically connected to the ground 230.

Such an ECR-type stylus pen 200 may generate a touch input by transmitting the pen resonance signal generated responding to the driving signal that is applied to the touch sensor 120 to the touch sensor 112 through the electrically coupled resonance by the conductive tip 210. Thus, the touch controller 120 may output a driving signal that includes a frequency signal (e.g., a sine wave, a square wave, and the like), which corresponds to a resonance frequency of the stylus pen 200, to the touch sensor 112 to thereby generate the pen resonance signal of the stylus pen 200.

The touch sensor 112 may include a plurality of touch electrodes for detection of a touch input. For example, in FIG. 1, the touch sensor 112 may include a plurality of first touch electrodes 301 and a plurality of second touch electrodes 302. In the present document, the plurality of first touch electrodes 301 are touch electrodes for acquiring coordinate values in a first coordinate axis (e.g., Y coordinate axis), and the plurality of second touch electrodes 302 are touch electrodes for acquiring coordinate values in a second coordinate axis (e.g., X coordinate axis) that perpendicularly crosses the first coordinate axis.

The respective touch electrodes 301 and 302 of the touch sensor 112, the conductive tip 210 of the stylus pen 200, and the substrate 111 of the touch panel 110 form capacitance Cx by the ECR, and the touch sensor 112 may detect a touch input by outputting an electrical signal (detection signal) corresponding to the capacitance Cx.

The touch sensor 112 may be used to detect a touch input by a touch object (e.g., a user's body (a finger and the like), or a passive or active stylus pen operating by a capacitive coupling method other than the ECR method) other than the ECR-type stylus pen 20.

Meanwhile, in FIG. 2, a case that the touch sensor 112 is used to detect a touch input of the stylus pen 200 driven by the ECR method is exemplarily illustrated, but the present invention is not limited thereto. The touch sensor 112 may be modified to detect a touch input of another type of stylus pen that generates a resonance signal responding to a driving signal applied to the touch sensor 112, and this is well known to a person of ordinary skill in the art.

In the following, in order to distinguish a stylus pen operating in a manner that generates a resonance signal in response to a driving signal applied to the touch sensor 112, as in the ECR method described above, from a passive or active type stylus pen operating in a different manner, a stylus pen that generates a resonance signal in response to a driving signal applied to the touch sensor 112 is collectively referred to as a resonant stylus pen.

The touch controller 120 controls driving of the touch sensor 112, and may output touch data that includes touch coordinate information corresponding to a touch detection result of the touch sensor 112.

Regardless of an operating method, when the resonance stylus pen 200 touches the touch apparatus 100, as shown in FIG. 3, the resonance stylus pen 200 may output a pen resonance signal in a touch driving mode section during which a driving signal is applied to the touch sensor 112 and some sections of an idle mode section during which the driving signal is disabled. Thus, the touch controller 120 receives detection signals of touch electrodes that form the touch sensor 112 during the touch driving mode section and some sections of the idle mode section, and may acquire position information (hereinafter, referred to as touch coordinate information) of a position where a touch of the resonance stylus pen 200 is generated.

Referring to FIG. 4, a detection signal 11 received from touch electrodes during the driving mode section during which driving signals are output to the touch electrodes may not only include a signal 13 corresponding to a pen resonance signal of the resonance stylus pen 200, but may also include a signal 12 corresponding to a driving signal applied to the touch sensor 112. Thus, in order to acquire touch coordinate information from the detection signal 11 received from the touch sensor 112 during the driving mode section, a valid signal used in touch coordinate detection, that is, a signal corresponding to the pen resonance signal 13 of the resonance stylus pen 200, needs to be extracted. For this, the touch controller 120 may extract a valid signal 13 from the detection signal 11 and a baseline signal 12. Here, the baseline signal 12 may store and use the detection signal 12 received from a touch electrode when no touch is generated, or a detection signal received from a touch electrode other than a touch electrode where a current touch needs to be detected may be used.

That is, the touch controller 120 may acquire a valid signal component (e.g., amplitude or signal intensity) that corresponds to a resonance signal of the resonance stylus pen 200 from a signal component difference between the baseline signal 12 and a detection signal 11 that is actually received from the touch sensor 112.

When the valid signal component is acquired through such a method, the touch controller 120 may acquire touch coordinate information through comparison with a predetermined threshold value. Here, signal components of the baseline signal 12 used to detect the valid signal component may be pre-acquired by measuring a detection signal output from the touch sensor 112 when no touch is generated, may be estimated from a driving signal output to the touch sensor 112 during the driving mode, or may be a detection signal received from another touch sensor in a state where no touch is generated.

Meanwhile, the touch sensor 112 may be used to detect a touch input by a touch object (e.g., a user's body, or a stylus pen operating by a method other than resonance, and the like) the resonance stylus pen 200. In this case, valid signal components extracted from the detection signal of the touch sensor 112 input during the driving mode may be a signal component that corresponds to a capacitance change due to a touch by a touch object other than the resonance stylus pen 200. Thus, the touch controller 120 may additionally perform a process for determining a type of a touch object by using the detection signal output from the touch sensor 112.

For example, the touch controller 120 may use valid signal components extracted from the detection signal of the touch sensor 112, received during the touch driving mode, to determine a type of a touch object. When a signal component corresponding to a resonance signal of the stylus pen 200 is detected from the valid signal (refer to reference numeral 13 of FIG. 4) extracted from the detection signal of the touch controller 120, the touch controller 120 may determine the touch object as a resonance stylus pen. On the contrary, when a signal component corresponding to the resonance signal of the resonance stylus pen is not detected from the valid signal 13, the touch controller 120 may determine that the type of the touch object is not a resonant stylus pen but a user's body part or another type of stylus pen.

In addition, for example, the touch controller 120 may determine the type of the touch object that generated the touch input from the detection signal received from the touch sensor 112 during the idle mode section. When a touch input by the resonance stylus pen 200 occurs, the resonance signal of the resonance stylus pen 200 continues not only during the touch driving mode section, but also during some subsequent idle mode sections. Thus, the resonance signal of the resonance stylus pen 200 affects the detection signal of the touch sensor 112 even in the idle mode. Accordingly, when a touch input is detected in the touch driving mode, the touch controller 120 may determine the type of the touch object that generated the touch input by analyzing the detection signal in the subsequent idle mode section.

Meanwhile, in FIG. 3, a case in which the driving mode of the touch sensor 112 is divided into a touch driving mode that outputs a driving signal for generating a resonance signal and an idle mode is illustrated as an example, but the present invention is not limited thereto. For example, when the touch sensor 112 is commonly used to detect a touch by a resonance stylus pen and a touch by another touch object (user's body part or other type of stylus pen), the touch driving mode of the touch sensor may be divided into a normal driving mode and a resonance driving mode as shown in FIG. 5.

Figure 5:
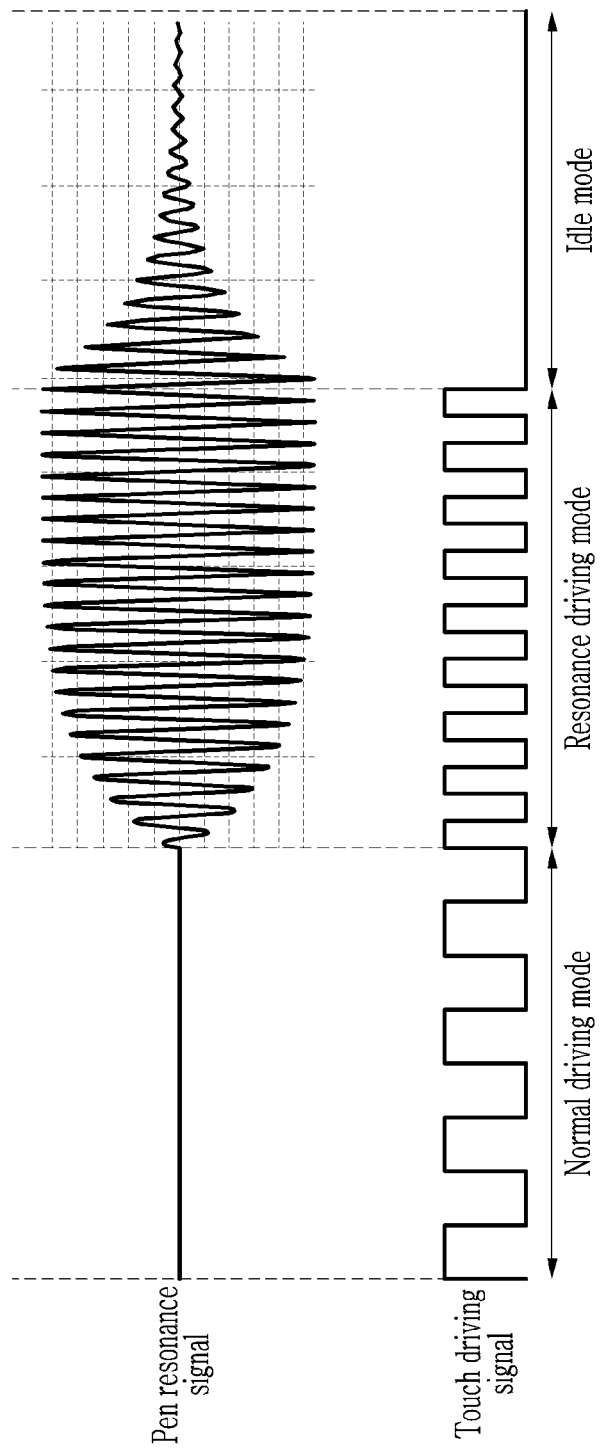
FIG. 5 illustrates another example of the driving mode of the touch apparatus according to the exemplary embodiment of the present invention.

FIG. 5 illustrates another example of the driving mode of the touch apparatus according to the exemplary embodiment of the present invention.

Referring to FIG. 5, the driving mode of the touch sensor 112 may include a normal driving mode, which is a touch driving mode, a resonance driving mode, and an idle mode.

The normal driving mode is a mode during which a driving signal is applied to the touch sensor 112 for detecting a touch input by touch objects (user's body parts or other types of stylus pens) other than the resonance stylus pen. During the normal driving mode, the touch controller 120 outputs the driving signal to the touch sensor 112, and may acquire touch coordinate information based on signal intensity of the detection signal received from the touch sensor 112.

The resonance driving mode is a mode that corresponds to the touch driving mode of FIG. 3, and is a mode during which a driving signal is applied to the touch sensor 112 for generating a resonance signal of the resonance stylus pen. During the resonance driving mode, the touch controller 120 outputs the driving signal to the touch sensor 112, and may acquire touch coordinate information by a touch input of the resonance stylus pen from the detection signal received from the touch sensor 112. In addition, during the resonance driving mode, the touch controller 120 may acquire touch coordinate information corresponding to a touch input by a user's body part from the detection signal received from the touch sensor 112.

Meanwhile, a frequency of the driving signal applied to the touch sensor 112 corresponds to a resonance frequency of the resonance stylus pen. For example, a frequency of the driving signal output to the touch sensor 112 during the resonance driving mode may be around 400 kHz. On the contrary, a frequency of the driving signal output to the touch sensor 112 during the normal driving mode is set to be different from the resonance frequency of the resonance stylus pen. For example, a frequency of the driving signal output to the touch sensor 112 during the normal driving mode may be set to be around 200 kHz. The frequency setting of the driving signal is only an example, and may be set to a value different from the above.

Referring to FIG. 2, impedance by the capacitance Cx is decreased as the frequency of the driving signal applied to the touch sensor 112 is increased. Accordingly, receiving sensitivity of the touch sensor 112 receiving the pen resonance signal of the resonance stylus pen 200 increases as the frequency of the driving signal applied to the touch sensor 112 increases, and the signal-to-noise ratio (SNR) of the pen resonance signal received by the touch sensor 112 may be improved. Thus, in order to detect the pen resonance signal of the resonance stylus pen, it is necessary to set the frequency of the driving signal to be as in the resonance driving mode of FIG. 5.

Meanwhile, in the resonance driving mode during which the frequency of the driving signal applied to the touch sensor 112 is set to be high, a touch input by the resonance stylus pen and a touch input by other types of touch objects (user's body parts or other types of stylus pens) both can be detected. On the other hand, in the normal driving mode during which the frequency of the driving signal applied to the touch sensor 112 is set to be relatively low compared to the resonance driving mode, even if a touch input by the resonant stylus pen occurs, a signal component corresponding to the pen resonance signal may hardly be included in the detection signal of the touch sensor 112.

The idle mode is a mode during which the driving signal applied to the touch sensor 112 is disabled. When a touch input is detected in the resonance driving mode, the touch controller 120 may determine the type of the touch object that generated the touch input by analyzing a detection signal in the subsequent idle mode section. That is, when a signal component corresponding to the resonance signal of the resonant stylus pen is detected from the detection signal received from the touch sensor 112 even after entering the idle mode section, the type of the touch object may be determined as a resonant stylus pen.

The touch apparatus 100 having the above-described structure may be coupled to an electronic device such as a display and used as an input device.

Figure 6:
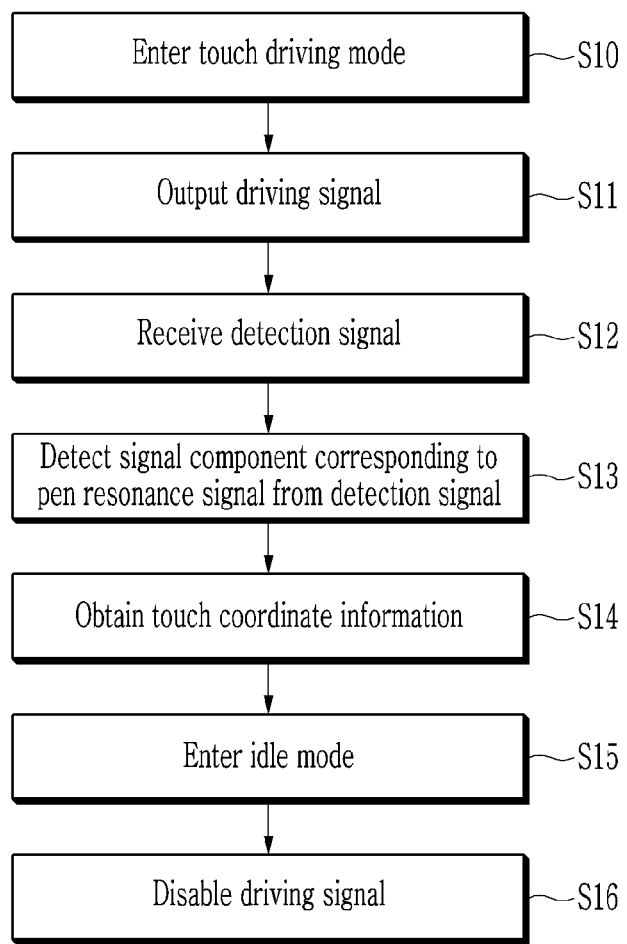
FIG. 6 schematically illustrates a touch detection method of the touch apparatus according to the exemplary embodiment of the present invention.

FIG. 6 schematically illustrates a touch detection method of the touch apparatus according to the exemplary embodiment of the present invention. A touch detection method shown in FIG. 6 may be executed by the touch controller 120 of the touch apparatus 100 described with reference to FIG. 1 to FIG. 5.

Referring to FIG. 6, the touch apparatus 100 according to the exemplary embodiment of the present invention applies a driving signal to the touch sensor 112 (S11), and receives a detection signal from the touch sensor (S12) as the touch apparatus 100 enters the touch driving mode (S10).

When receiving the detection signal from the touch sensor 112 in the touch driving mode section, the touch apparatus 100 detects an effective signal component corresponding to a pen resonance signal from the received detection signal (S13), and acquires touch coordinate information by analyzing the detected effective signal component (S14).

In S13 and S14, the touch apparatus 100 acquires the effective signal component corresponding to the pen resonance signal from a signal component difference between a baseline signal and the detection signal received from the touch sensor 112, and acquires touch coordinate information due to an ECR pen by analyzing the acquired effective signal component.

After that, the touch apparatus 100 enters the idle mode (S150), and disables the driving signal output to the touch sensor 112 (S16).

The touch apparatus 100 may perform continuous touch detection by repeating S10 and S16 while the touch apparatus 100 is driven.

As described above, according to the touch detection method described referring to FIG. 6, the touch apparatus 100 detects the touch coordinate information from the detection signal received from the touch sensor 112 for the touch driving mode during which the driving signal is output to the touch sensor 112 rather than for the idle mode during which the driving signal is not applied to the touch sensor 112. Accordingly, compared to the conventional method of acquiring the touch coordinate information of the resonance stylus pen by receiving the detection signal while the driving signal is not applied to the touch sensor, the SNR of the effective signal used for touch coordinate detection is improved, and sufficient touch signal processing time can be secured.

Meanwhile, intensity of the resonance signal of the stylus pen 200, generated responding to the driving signal of the touch sensor 112 may be increased as the number of driving channels to which the same driving signal is simultaneously applied is increased in the touch sensor 112. Thus, in the exemplary embodiment of the present invention to be described later, the intensity of the resonance signal generated by the resonance stylus pen 200 may be increased by increasing the number of driving channels to which the driving signal is simultaneously applied. For example, the touch controller 120 may simultaneously output the same driving signal to all of the plurality of first touch electrodes 301 and/or to all of the plurality of second touch electrodes 302.

Figure 7:
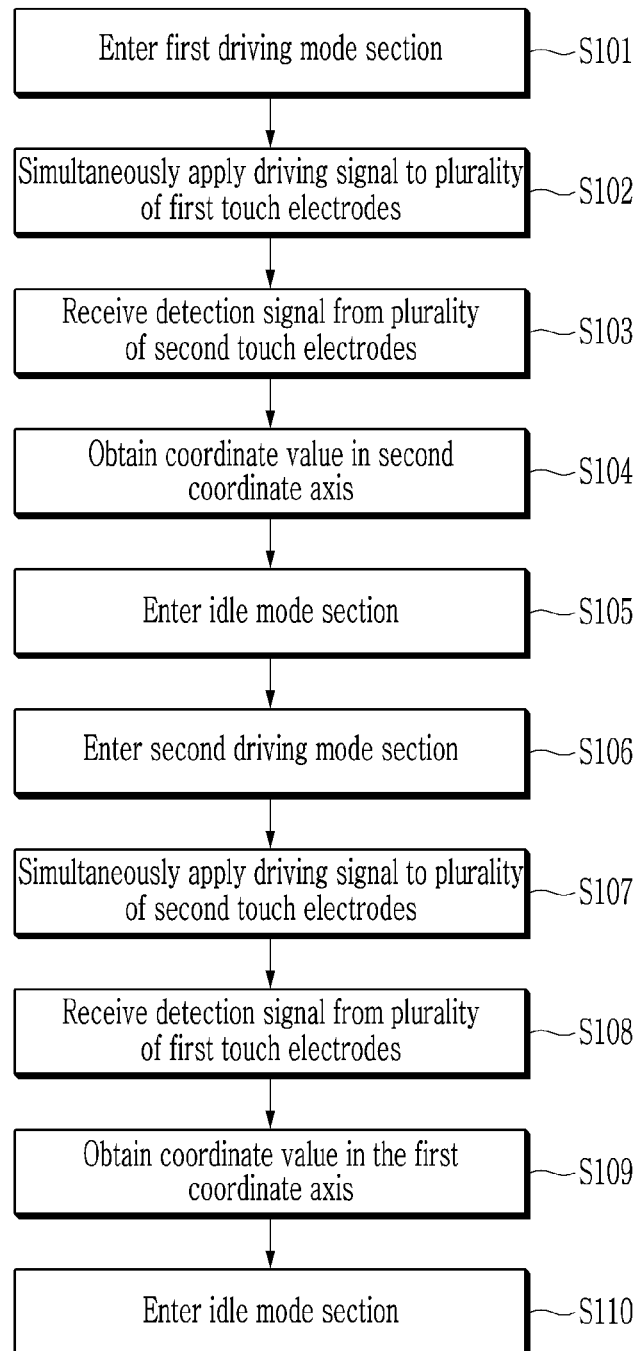
FIG. 7 schematically illustrates a touch detection method according to another exemplary embodiment of the present invention.

FIG. 7 schematically illustrates a touch detection method according to another exemplary embodiment of the present invention. In addition, FIG. 8 illustrates an example of a driving signal output to touch electrodes according to the touch detection method of FIG. 7.

The touch detection method of FIG. 7 is a touch detection method in a case that the touch apparatus 100 described with reference to FIG. 1 to FIG. 5 operates in a mutual capacitance manner, and may be performed by the touch controller 120. In addition, first and second driving mode sections in FIG. 7 and FIG. 8 may be sections corresponding to the touch driving mode of FIG. 3 or the resonance driving mode of FIG. 5, and first and second idle mode sections may be sections corresponding to the idle modes of FIG. 3 and FIG. 5.

Figure 8:
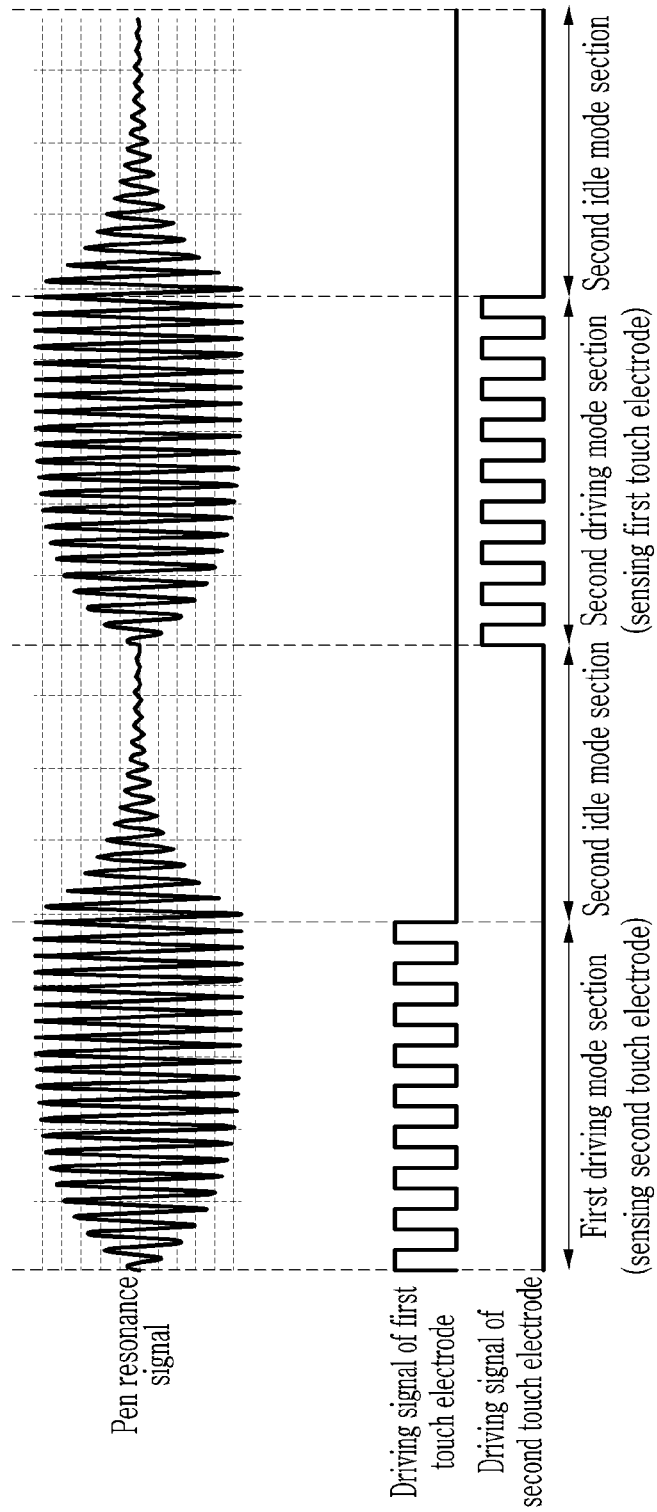
FIG. 8 illustrates an example of a driving signal output to touch electrodes according to the touch detection method of FIG. 7.

Referring to FIG. 7 and FIG. 8, the touch controller 120 enters the first driving mode section (S101), and simultaneously applies a driving signal for generation of a resonance signal of the resonance stylus pen 200 to all of the first touch electrodes 301 that form the touch sensor 112 (S102).

In addition, the touch controller 120 receives detection signals from the second touch electrodes 302 during the first driving mode section (S103), and acquires touch coordinate information (coordinate values in the second coordinate axis (e.g., X-coordinate axis) at a position where a touch of the resonance stylus pen 200 by using the received detection signal (S104).

After that, when the first driving mode section is terminated and the touch controller 120 enters the first idle mode section (S105), the touch controller 112 disables the driving signal output to the touch sensor 112. Meanwhile, the touch controller 120 receives detection signals from the plurality of first touch electrodes 301 or the plurality of first and second touch electrodes 301 and 302 during the first idle mode section, and may determine the type of the touch object that generated the touch input by analyzing the received detection signals.

In addition, when the first idle mode section is terminated and the touch controller 120 enters the second driving mode section (S106), the touch sensor 112 simultaneously applies a driving signal for generation of a resonance signal of the resonance stylus pen 200 to all of the second touch electrodes 302 that form the touch sensor 112 (S107).

In addition, the touch controller 120 receives a detection signal from the first touch electrode 301 during the second driving mode section (S108), and acquires touch coordinate information (i.e., coordinate values of touch coordinate information (i.e., first coordinate axis (e.g., Y-coordinate axis)) at a position where a touch of the resonance stylus pen 200 is generated by using the received detection signal (S109).

When the second driving mode section is terminated and the touch controller 120 enters the second idle node section (S110), the touch controller 120 disables the driving signal output to the touch sensor 112. Meanwhile, the touch controller 120 receives detection signals from only the plurality of second touch electrodes 302 or from all of the first and second touch electrodes 301 and 302 during the second idle mode section, and may determine the type of the touch object that generated the touch input by analyzing the received detection signal.

The touch apparatus 100 may perform continuous touch detection by repeating S101 and S110 while the touch apparatus 100 is driven.

As described above, in the touch detection method described with reference to FIG. 7 and FIG. 8, the same driving signal is simultaneously applied to all the first touch electrodes 301 in the first driving mode section, and the same driving signal is simultaneously applied to all the second touch electrodes 302 in the second driving mode section such that intensity of the resonance signal of the stylus pen 200, responding to the driving signal, is improved.

In addition, compared to the conventional method of acquiring the touch coordinate information of the resonance stylus pen by receiving the detection signal while the driving signal is not applied to the touch sensor, the SNR of the effective signal used for touch coordinate detection is improved, and sufficient touch signal processing time can be secured by detecting the touch coordinate information from the detection signal received from the touch sensor 112 for the driving mode during which the driving signal is output to the touch sensor 112.

On the other hand, in a touch apparatus operating in a mutual capacitance method, when simultaneously outputting the same driving signal for generating a resonance signal of the stylus pen 200 to all touch electrodes extending in the same direction, only the touch coordinate value for one coordinate axis can be obtained. For example, when a driving signal is simultaneously applied to the first touch electrodes 301, the touch coordinate value of the first coordinate axis (e.g., Y-coordinate axis) divided by the first touch electrode 301 cannot be obtained, and thus only touch coordinate values at the second coordinate axis (e.g., X-coordinate axis) divided by the second touch electrode 302 can be obtained.

Thus, in the touch detection method described with reference to FIG. 7 and FIG. 8, in order to solve the above stated problem, touch coordinate values in the second coordinate axis are obtained by using detection signals of the second touch electrodes 302 in the first driving mode section during which the driving signal is simultaneously applied to the first touch electrodes 301, and touch coordinate values in the first coordinate axis are obtained by using detection signals of the first touch electrode 301 in the second driving mode section during which the driving signal is simultaneously applied to the second touch electrodes 302.

Figure 9:
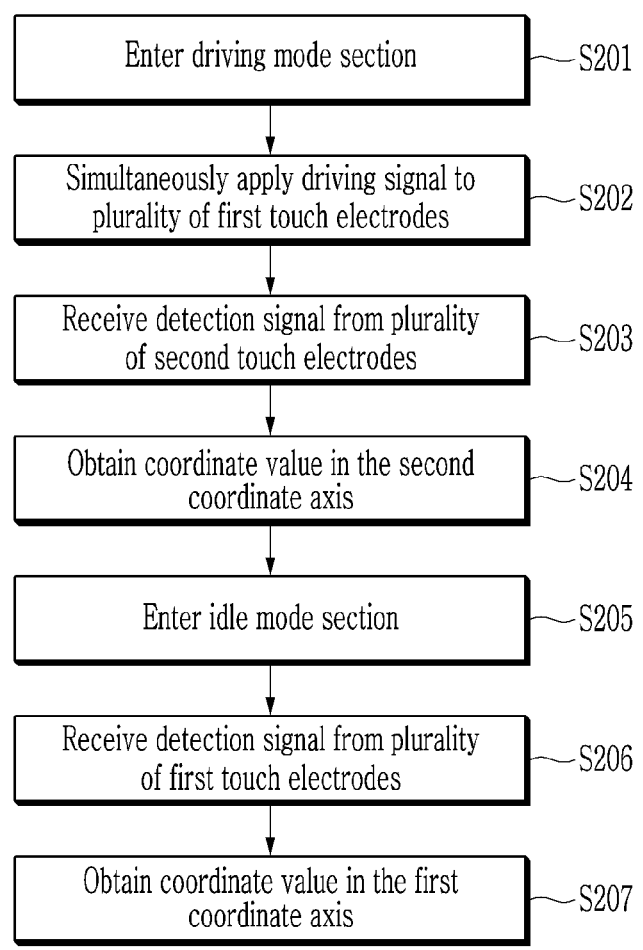
FIG. 9 schematically illustrates a touch detection method according to another exemplary embodiment of the present invention.
Figure 10:
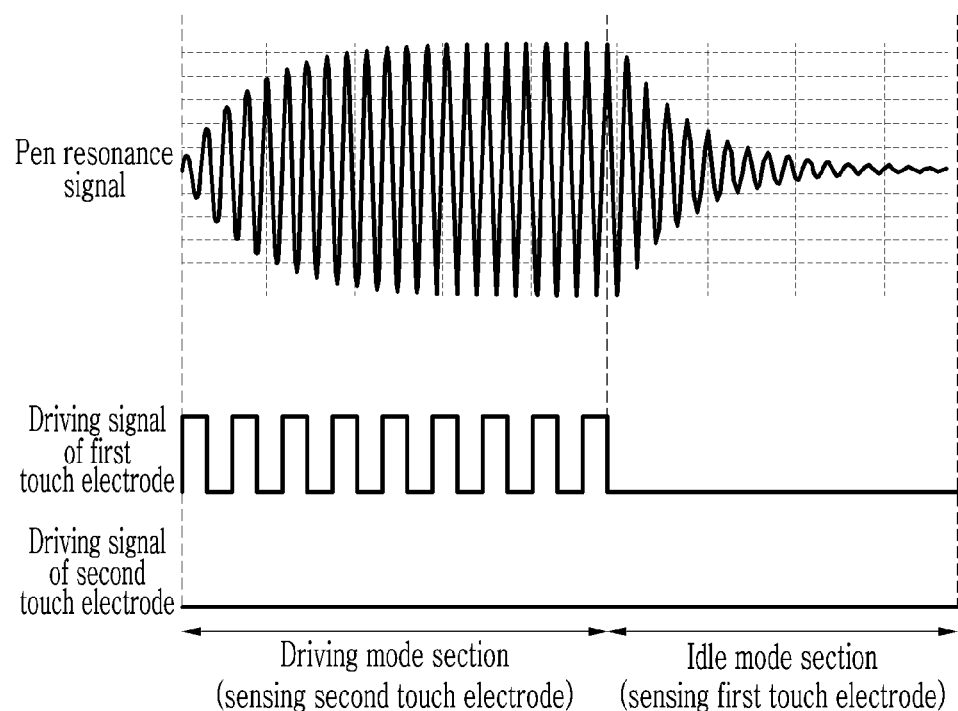
FIG. 10 illustrates an example of a driving signal output to touch electrodes according to the touch detection method of FIG. 9.

FIG. 9 schematically illustrates a touch detection method according to another exemplary embodiment of the present invention. FIG. 10 illustrates an example of a driving signal output to touch electrodes according to the touch detection method of FIG. 9.

The touch detection method of FIG. 9 is a touch detection method in a case that the touch apparatus 100 described with reference to FIG. 1 to FIG. 4 operates in the mutual capacitance method, and may be performed by the touch controller 120. In addition, in FIG. 9 and FIG. 10, a driving mode section may be a section corresponding to the touch driving mode of FIG. 3 or the resonance driving mode of FIG. 5, and an idle mode section may be a section corresponding to the idle modes of FIG. 3 and FIG. 5.

Referring to FIG. 9 and FIG. 10, the touch controller 120 enters a driving mode (S201), and simultaneously applies a driving signal for generating a resonance signal of the resonance stylus pen 200 to all of the first touch electrodes 301 that form the touch sensor 112 (S201).

In addition, the touch controller 120 receives detection signals from the second touch electrodes 302 during the driving mode section (S203), and obtains touch coordinate information (i.e., coordinate values at a position in the second coordinate axis (e.g., X-coordinate axis)) at a position where a touch of the resonance stylus pen 20 is generated by using the received detection signal (S204).

After that, the driving mode section is terminated and thus the touch controller 120 enters the idle mode section (S205), and the touch controller 120 disables the driving signal output to the touch sensor 112. In addition, the touch controller 120 receives detection signals from the first touch electrodes 301 for a predetermined time period after entering the idle mode section (S206), and obtains touch coordinate information (i.e., coordinate values in the first coordinate axis (e.g., Y-coordinate axis) at a position where a touch of the stylus pen 200 is generated by using the received detection signal (S207).

Meanwhile, the touch controller 120 receives detection signals from only the plurality of first touch electrodes 301 or from all of the first and second touch electrodes 301 and 302 during the idle mode section, and may determine the type of the touch object that generated the touch input by analyzing the received detection signal.

The touch apparatus 100 may perform continuous touch detection by repeating S201 and S207 while the touch apparatus 100 is driven.

As described above, in the touch detection method described with reference to FIG. 9 and FIG. 10, the same driving signal is applied to all of the first and second touch electrodes 301 and 302 in the driving mode section such that intensity of the resonance signal of the resonance stylus pen, responding to the driving signal, can be improved.

In addition, some touch coordinate information is obtained by processing the detection signals of the plurality of second touch electrodes 302 during the driving mode in which the driving signal is output to the touch sensor 112, and remaining touch coordinate information is obtained by processing the detection signals of the plurality of first touch electrodes 301 during the idle mode such that the SNR of an effective signal used for touch coordinate detection can be improved, and sufficient touch signal processing time can be secured.

In addition, in order to solve a coordinate acquisition problem that occurs due to simultaneous application of the same driving signal to all the driving electrodes, a touch coordinate value in the second coordinate axis is obtained by using the detection signals of the second touch electrodes 302 in the driving mode section, and a touch coordinate value in the first coordinate axis is obtained by using the detection signals of the first touch electrodes 301 in some section during which a resonance signal is received in the idle mode section.

Meanwhile, for the touch apparatus operating in the mutual capacitance method to obtain touch coordinate information by using the touch detection methods described with reference to FIG. 7 and FIG. 9, the touch apparatus needs a driving signal for generation of a resonance signal of the stylus pen 200 not only with respect to the touch electrodes operating as driving electrodes but also with respect to touch electrodes operating as detection electrodes. In addition, the touch apparatus needs to receive and process detection signals not only with respect to touch electrodes operating as detection electrodes, but also with respect to touch electrodes operating as driving electrodes. Thus, in order to implement the touch detection method described with reference to FIG. 7 and FIG. 9, the touch controller 120 may be designed to enable output of a driving signal, receiving of a detection signal, and acquisition of touch coordinate information using the same for all of the plurality of first touch electrodes 301 and the plurality of second touch electrodes 302.

Figure 11:
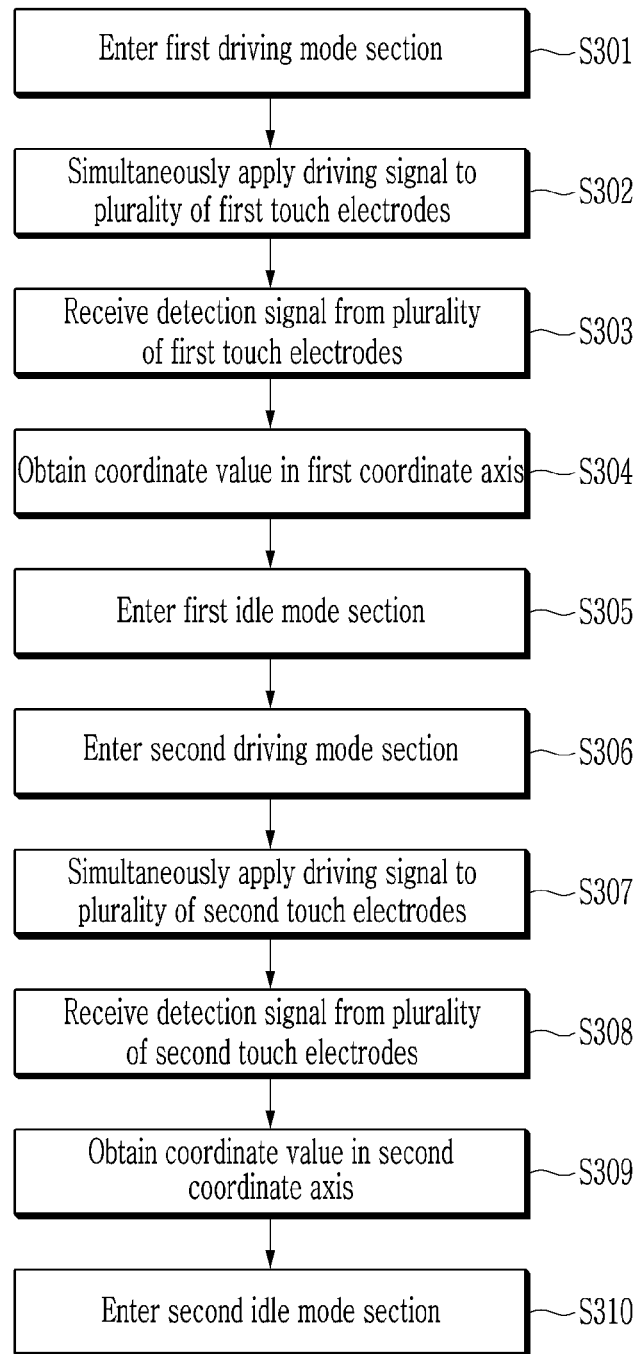
FIG. 11 schematically illustrates a touch detection method according to another exemplary embodiment of the present invention.

FIG. 11 schematically illustrates a touch detection method according to another exemplary embodiment of the present invention. In addition, FIG. 12 shows an example of a driving signal output to touch electrodes according to the touch detection method of FIG. 11.

The touch detection method of FIG. 11 illustrates a case that the touch apparatus 100 described with reference to FIG. 1 to FIG. 4 operates in a self-capacitive method, and may be performed by the touch controller 120. In addition, first and second driving mode sections in FIG. 11 and FIG. 12 are sections corresponding to the touch driving mode of FIG. 3 or the resonance driving mode of FIG. 5, and first and second idle mode sections are sections corresponding to the idle modes of FIG. 3 and FIG. 5.

Figure 12:
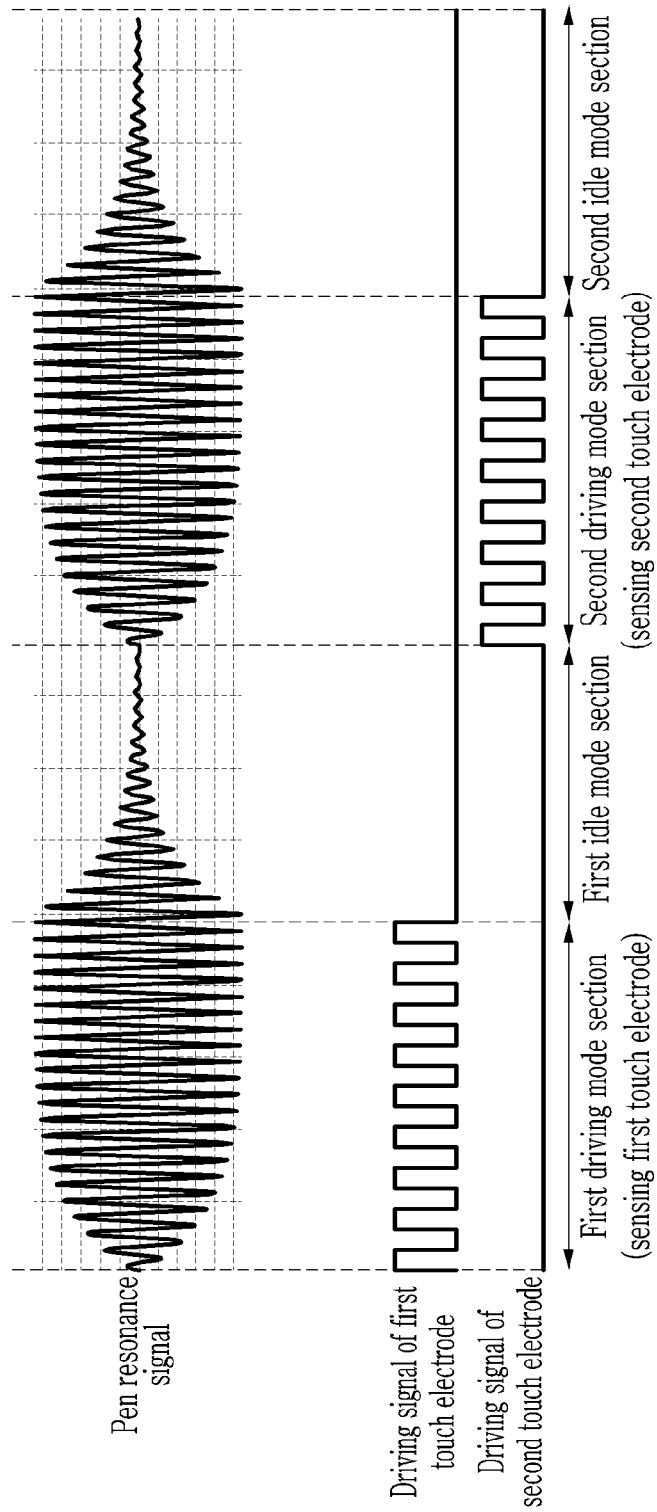
FIG. 12 shows an example of a driving signal output to touch electrodes according to the touch detection method of FIG. 11.

Referring to FIG. 11 and FIG. 12, the touch controller 120 enters the first driving mode section (S301), and the touch controller 120 simultaneously applies a driving signal for generation of a resonance signal of the resonance stylus pen 200 to all of the first touch electrodes 301 that form the touch sensor 112 (S302).

In addition, the touch controller 120 receives a detection signal (S303) from the first touch electrodes 301 during the first driving mode section, and obtains touch coordinate information (i.e., a coordinate value in the first coordinate axis (e.g., Y-coordinate axis)) at a position where a touch of the resonance stylus pen 200 is generated by using the received detection signal (S304).

After that, when the touch controller 120 enters the first idle mode section after termination of the first driving mode section (S305), the touch controller 120 disables the driving signal output to the touch sensor 112. Meanwhile, the touch controller 120 receives detection signals from only the plurality of second touch electrodes 302 or from all of the first and second touch electrodes 301 and 302 during the first idle mode section, and may determine the type of the touch object that generated the touch input by analyzing the received detection signal.

In addition, when the touch controller 120 enters the second driving mode section after termination of the first idle mode section (S306), the touch controller 120 simultaneously applies the driving signal for generation of the resonance signal of the resonance stylus pen 200 to all of the second touch electrodes 302 that form the touch sensor 112 (S307).

In addition, the touch controller 120 receives detection signals from the second touch electrodes 302 during the second driving mode section (S308), and obtains touch coordinate information (i.e., a coordinate value in the second coordinate axis (e.g., X-coordinate axis)) at a position where a touch of the resonance stylus pen 200 is generated by using the received detection signal (S309).

In addition, when the touch controller 120 enters the second idle mode section after termination of the second driving mode section (S310), the touch controller 120 disables the driving signal output to the touch sensor 112. Meanwhile, the touch controller 120 receives detection signals from only the plurality of first touch electrodes 301 or from all of the first and second touch electrodes 301 and 302 during the second idle mode section, and may determine the type of the touch object that generated the touch input by analyzing the received detection signal.

The touch apparatus 100 may perform continuous touch detection by repeating S301 and S310 while the touch apparatus 100 is driven.

As described above, in the touch detection method described with reference to FIG. 11 and FIG. 12, the same driving signal is simultaneously applied to all the first touch electrodes 301 in the first driving mode section, and the same driving signal is simultaneously applied to all the second touch electrodes 302 in the second driving mode section such that intensity of the resonance signal of the stylus pen 200, responding to the driving signal, is improved.

In addition, since the touch coordinate information is detected from the detection signal received from the touch sensor 112 not for the idle mode during which the driving signal is not applied to the touch sensor 112 but for the driving mode during which the driving signal is output to the touch sensor 112, compared to the conventional method of acquiring the touch coordinate information of the resonant stylus pen by receiving the detection signal while the driving signal is not applied by the touch sensor, the SNR of the effective signal used for touch coordinate detection is improved, and sufficient touch signal processing time can be secured.

Figure 13:
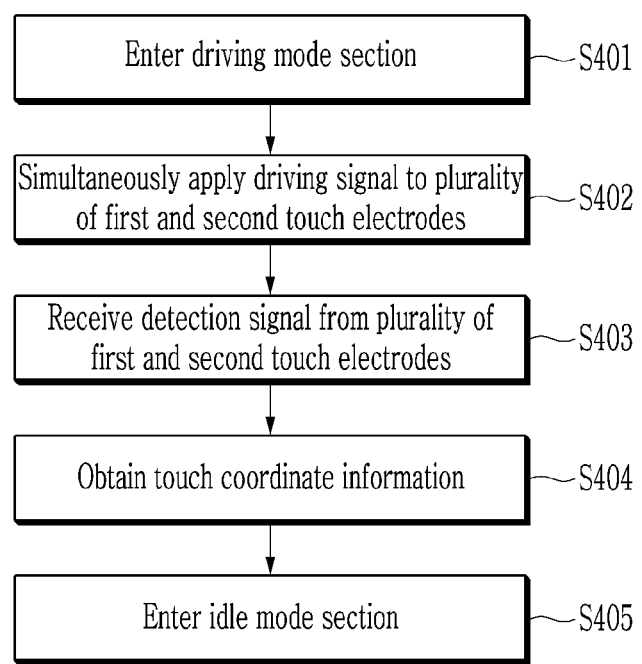
FIG. 13 schematically illustrates a touch detection method according to another exemplary embodiment of the present invention.

FIG. 13 schematically illustrates a touch detection method according to another exemplary embodiment of the present invention. In addition, FIG. 14 illustrates an example of a driving signal output to touch electrodes according to the touch detection method of FIG. 13.

The touch detection method of FIG. 13 illustrates a case that the touch apparatus 100 described with reference to FIG. 1 to FIG. 4 operates in a self-capacitive method, and may be performed by the touch controller 120. In addition, a driving mode section in FIG. 13 and FIG. 14 is a section corresponding to the touch driving mode of FIG. 3 or the resonance driving mode of FIG. 5, and an idle mode section is a section corresponding to the idle modes of FIG. 3 and FIG. 5.

Figure 14:
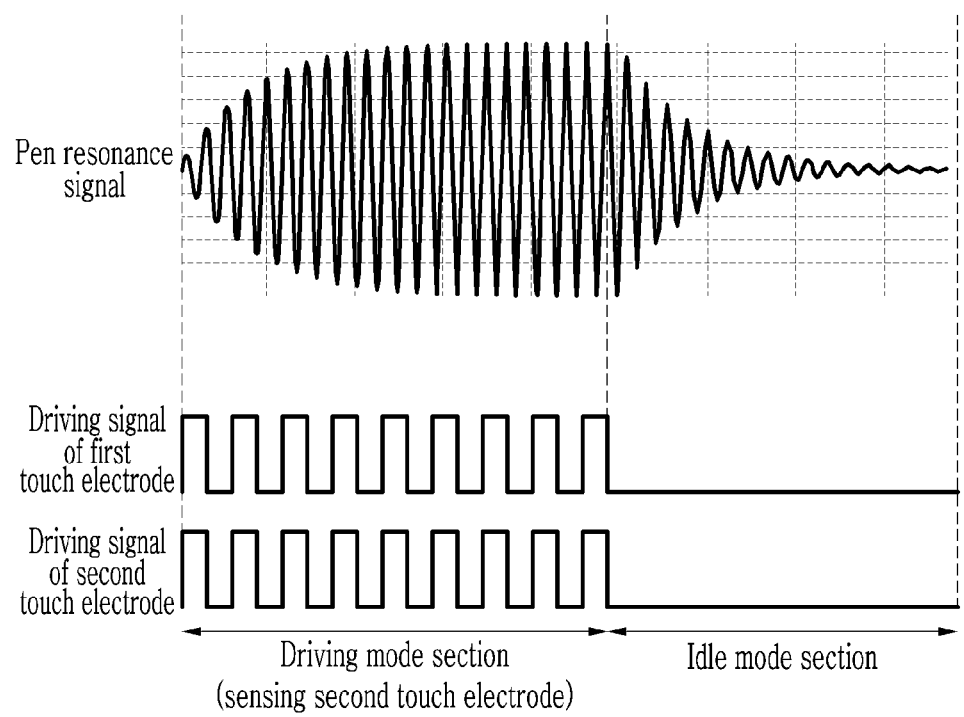
FIG. 14 illustrates an example of a driving signal output to touch electrodes according to the touch detection method of FIG. 13.

Referring to FIG. 13 and FIG. 14, the touch controller 120 enters the driving mode section (S401), and the touch controller 120 simultaneously applies a driving signal for generation of a resonance signal of the resonance stylus pen 200 to all of the first and second touch electrodes 301 and 302 that form the touch sensor 112 (S402).

In addition, the touch controller 120 receives a detection signal from all of the first and second touch electrodes 301 and 302 during the driving mode section (S403), and obtains touch coordinate information (i.e., a coordinate value in the second coordinate axis (e.g., X-coordinate axis) and a coordinate value in the first coordinate axis (e.g., Y-coordinate axis)) at a position where a touch of the resonance stylus pen 200 is generated by using the received detection signal (S404).

After that, when the touch controller 120 enters the idle mode section after termination of the driving mode section (S405), the touch controller 120 disables the driving signal output to the touch sensor 112. Meanwhile, the touch controller 120 receives detection signals from only the plurality of first touch electrodes 301 or from all of the first and second touch electrodes 301 and 302 during the idle mode section, and may determine the type of the touch object that generated the touch input by analyzing the received detection signal.

The touch apparatus 100 may perform continuous touch detection by repeating S401 and S405 while the touch apparatus 100 is driven.

As described above, in the touch detection method described with reference to FIG. 13 and FIG. 14, the same driving signal is simultaneously applied to all the touch electrodes 301 and 302 in the driving mode section such that intensity of the resonance signal of the stylus pen 200, responding to the driving signal, is improved.

In addition, since the touch coordinate information is detected from the detection signal received from the touch sensor 112 not for the idle mode during which the driving signal is not applied to the touch sensor 112 but for the driving mode during which the driving signal is output to the touch sensor 112, compared to the conventional method of acquiring the touch coordinate information of the resonant stylus pen by receiving the detection signal while the driving signal is not applied by the touch sensor, the SNR of the effective signal used for touch coordinate detection is improved, and sufficient touch signal processing time can be secured.

Figure 15:
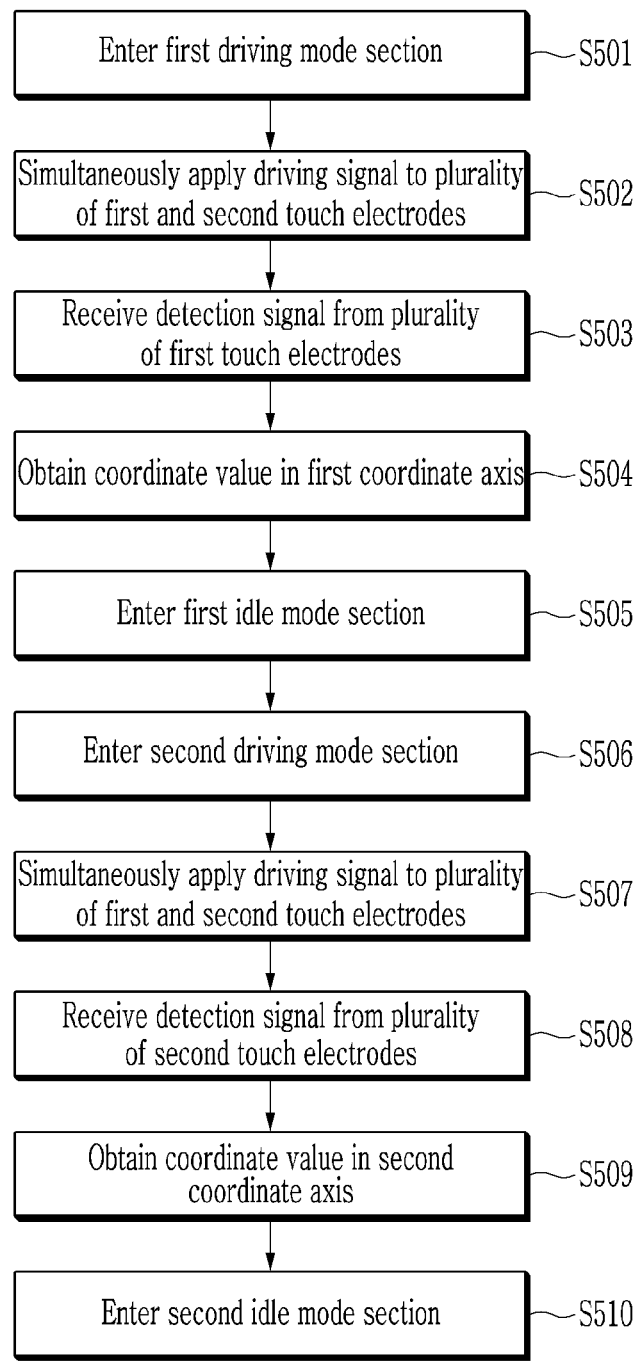
FIG. 15 schematically illustrates a touch detection method according to another exemplary embodiment of the present invention.

FIG. 15 schematically illustrates a touch detection method according to another exemplary embodiment of the present invention. In addition, FIG. 16 illustrates an example of a driving signal output to touch electrodes according to the touch detection method of FIG. 15.

The touch detection method of FIG. 15 illustrates a case that the touch apparatus 100 described with reference to FIG. 1 to FIG. 4 operates in a self-capacitive method, and may be performed by the touch controller 120. In addition, a driving mode section in FIG. 15 and FIG. 16 is a section corresponding to the touch driving mode of FIG. 3 or the resonance driving mode of FIG. 5, and an idle mode section is a section corresponding to the idle modes of FIG. 3 and FIG. 5.

Figure 16:
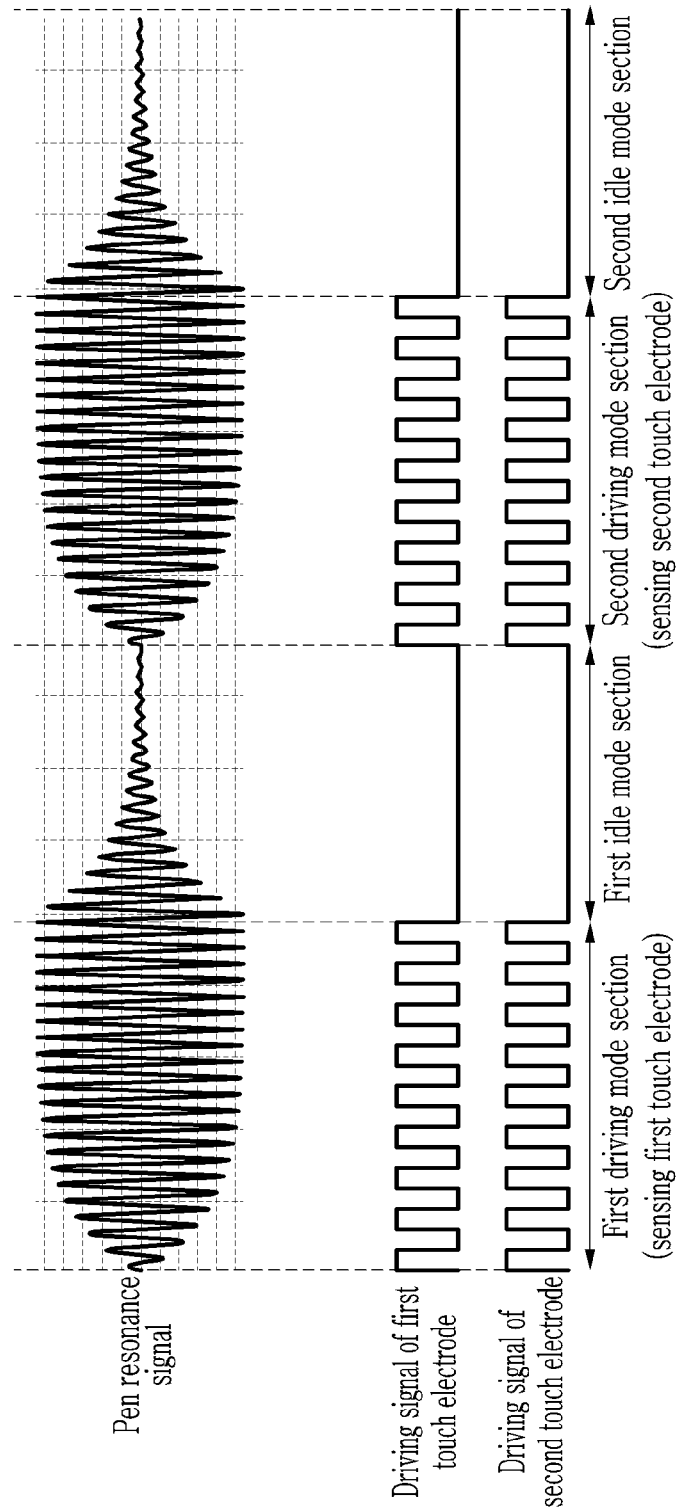
FIG. 16 illustrates an example of a driving signal output to touch electrodes according to the touch detection method of FIG. 15.

Referring to FIG. 15 and FIG. 16, the touch controller 120 enters the first driving mode section (S501), and the touch controller 120 simultaneously applies a driving signal for generation of a resonance signal of the resonance stylus pen 200 to all of the first and second touch electrodes 301 and 302 that form the touch sensor 112 (S502).

In addition, the touch controller 120 receives a detection signal from all of the first touch electrodes 301 during the first driving mode section (S503), and obtains touch coordinate information (i.e., a coordinate value in the second coordinate axis (e.g., X-coordinate axis)) at a position where a touch of the resonance stylus pen 200 is generated by using the received detection signal (S504).

After that, when the touch controller 120 enters the idle mode section after termination of the driving mode section (S505), the touch controller 120 disables the driving signal output to the touch sensor 112. Meanwhile, the touch controller 120 receives detection signals from the second touch electrodes 302 during the first idle mode section, and may determine the type of the touch object that generated the touch input by analyzing the received detection signal.

In addition, when the first idle mode section is terminated and the touch controller 120 enters the second driving mode section (S506), the touch controller 120 simultaneously applies a driving signal for generation of the resonance signal of the resonance stylus pen 200 to all of the first and second touch electrodes 301 and 302 that form the touch sensor 112 (S507).

In addition, the touch controller 120 receives the detection signal from the second touch electrodes 302 during the second driving mode section (S508), and obtains touch coordinate information (i.e., a coordinate value in the second coordinate axis (e.g., X-coordinate axis)) at a position where a touch of the resonance stylus pen 200 is generated by using the received detection signal (S509)

In addition, when the touch controller 120 enters the second idle mode section after termination of the second driving mode section (S510), the touch controller 120 disables the driving signal output to the touch sensor 112. Meanwhile, the touch controller 120 receives detection signals from only the plurality of first touch electrodes 301 during the second idle mode section, and may determine the type of the touch object that generated the touch input by analyzing the received detection signal.

The touch apparatus 100 may perform continuous touch detection by repeating S501 and S510 while the touch apparatus 100 is driven As described above, in the touch detection method described with reference to FIG. 15 and FIG. 16, the same driving signal is applied to all of the touch electrodes 301 and 302 in the driving mode section such that intensity of the resonance signal of the resonance stylus pen, responding to the driving signal, can be improved.

In addition, since the touch coordinate information is detected from the detection signal received from the touch sensor 112 not for the idle mode during which the driving signal is not applied to the touch sensor 112 but for the driving mode during which the driving signal is output to the touch sensor 112, compared to the conventional method of acquiring the touch coordinate information of the resonant stylus pen by receiving the detection signal while the driving signal is not applied by the touch sensor, the SNR of the effective signal used for touch coordinate detection is improved, and sufficient touch signal processing time can be secured.

Figure 17:
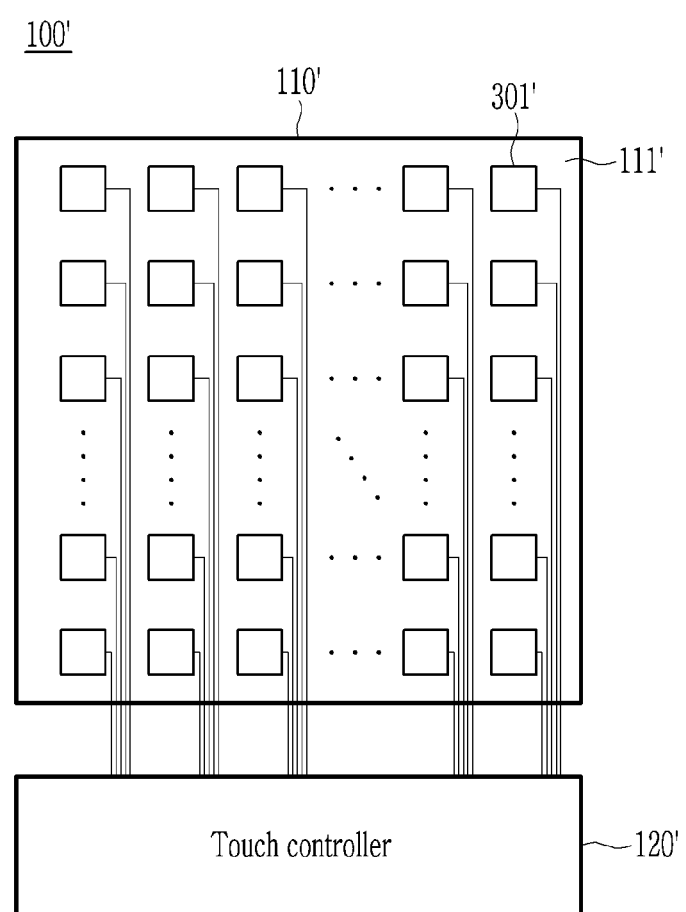
FIG. 17 illustrates another example of a touch apparatus according to another exemplary embodiment of the present invention.

FIG. 17 illustrates another example of a touch apparatus according to another exemplary embodiment of the present invention.

Referring to FIG. 17, a touch apparatus 100' includes a touch panel 110' and a touch controller 120', and the touch panel 110' may include a substrate 111' and a touch sensor (refer to reference numeral 112 of FIG. 2) disposed on the substrate 111'.

The touch apparatus 100' of FIG. 17 is a touch apparatus operating in a self-capacitive method, and the touch sensor 112 may include a plurality of touch electrodes 301' arranged in a dot matrix format.

A plurality of touch electrodes 301' receive a driving signal for generation of a resonance signal of a resonance stylus pen (refer to reference numeral 200 of FIG. 2) from the touch controller 120', and may output a detection signal corresponding to a touch detection result to the touch controller 120'.

The touch controller 120' controls driving of the plurality of touch electrodes 301', and may output touch coordinate information corresponding to the touch detection result by using the detection signal input from the plurality of touch electrodes 301'.

Figure 18:
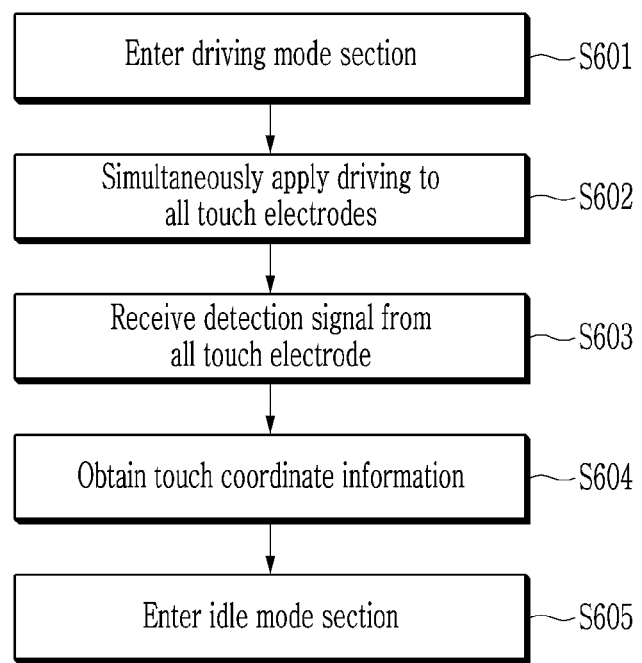
FIG. 18 schematically illustrates a touch detection method according to another exemplary embodiment of the present invention.

FIG. 18 schematically illustrates a touch detection method according to another exemplary embodiment of the present invention.

The touch detection method illustrated in FIG. 18 may be performed by the touch apparatus 100' described with reference to FIG. 17. In addition, a driving mode in FIG. 18 is a section corresponding to the touch driving mode of FIG. 3 or the resonance driving mode of FIG. 5, and an idle mode section is a section corresponding to the idle modes of FIG. 3 and FIG. 5.

Referring to FIG. 18, a touch controller 120' enters a driving mode section (S601), and simultaneously applies a driving signal for generation of a resonance signal of a stylus pen 200 to all of a plurality of touch electrodes 301' that form a touch sensor 112 (S602).

In addition, the touch controller 120 receives a detection signal from all of the plurality of touch electrodes 301' during the driving mode section (S603), and obtains touch coordinate information at a position where a touch of the stylus pen 200 is generated by using the received detection signal (S604).

In the touch electrodes 301' arranged in the dot matrix format, coordinate values in the corresponding first and second coordinate axes are mapped for each touch electrode. Thus, the touch controller 120 can acquire all coordinate values in the first and second coordinate axes constituting the touch coordinate information simply by detecting the touch electrode 301' where the touch is generated.

After that, when the touch controller 120 enters an idle mode section after termination of the driving mode section (S605), the touch controller 120 disables a driving signal output to the plurality of touch electrodes 301'. Meanwhile, the touch controller 120 may receive detection signals from the plurality of touch electrodes 301' during the idle mode section, and determine the type of the touch object that generated the touch input by analyzing the received detection signals.

The touch apparatus 100 may perform continuous touch detection by repeating S601 and S605 while the touch apparatus 100 is driven.

As described above, in the touch detection method described with reference to FIG. 18, the same driving signal is simultaneously applied to all the touch electrodes 301' in the driving mode section to thereby improve intensity of the resonance signal of the resonance stylus pen 200 responding to the driving signal.

In addition, since the touch coordinate information is detected from the detection signal received from the touch sensor 112 not for the idle mode during which the driving signal is not applied to the touch sensor 112 but for the driving mode during which the driving signal is output to the touch sensor 112, compared to the conventional method of acquiring the touch coordinate information of the resonant stylus pen by receiving the detection signal while the driving signal is not applied by the touch sensor, the SNR of the effective signal used for touch coordinate detection is improved, and sufficient touch signal processing time can be secured.

The detailed description above should not be construed as restrictive in all respects and should be considered as illustrative. The range of the present invention should be determined by rational interpretation of the attached claims, and all changes within the equivalent range of the present invention are included in the range of the present invention.

The invention claimed is:

1. A touch apparatus comprising:
    a touch sensor; and
    a touch controller that operates in a resonance driving mode during which a first driving signal is output for generation of a resonance signal of a stylus pen and an idle mode during which the outputting of the first driving signal is stopped, and obtains first touch coordinate information from a detection signal input from the touch sensor during the resonance driving mode,
    wherein the touch controller obtains an effective signal by using a baseline signal, and the detection signal output from the touch sensor during the resonance driving mode, and obtains the first touch coordinate information from the effective signal.

2. The touch apparatus of claim 1, wherein the touch controller determines a type of a touch object that generated a touch input by using the effective signal.

3. The touch apparatus of claim 2, wherein the touch controller recognizes the touch object as the stylus pen when the effective signal is a signal that corresponds to a resonance signal of the stylus pen.

4. The touch apparatus of claim 1, wherein, when a touch input with respect to the touch sensor is detected, the touch controller determines a type of a touch object that generated the touch input from a detection signal input from the touch sensor during the idle mode.

5. The touch apparatus of claim 1, wherein a frequency of the first driving signal corresponds to a resonance frequency of the stylus pen.

6. The touch apparatus of claim 5, wherein the touch controller operates in a normal driving mode during which a second driving signal of which a frequency is different from that of the first driving signal is output to the touch sensor.

7. The touch apparatus of claim 6, wherein the touch controller obtains second touch coordinate information by using a detection signal input from the touch sensor during the normal driving mode.

8. The touch apparatus of claim 6, wherein a frequency of the first driving signal in the resonance driving mode is different from a frequency of the second driving signal in the normal driving mode.

9. A touch detection method of a touch apparatus, comprising:
   entering a resonance driving mode, and outputting a first driving signal for generation a resonance signal of a stylus pen;
   receiving a detection signal from the touch sensor during the resonance driving mode;
   obtaining first touch coordinate information from the detection signal; and
   entering an idle mode, and stopping outputting of the first driving signal,
   wherein the obtaining of the first touch coordinate information comprises:
   obtaining an effective signal by using a baseline signal, and the detection signal received from the touch sensor during the resonance driving mode; and
   obtaining the first touch coordinate information from the effective signal.

10. The touch detection method of the touch apparatus of claim 9, further comprising recognizing a touch object that generated a touch input by using the effective signal.

11. The touch detection method of the touch apparatus of claim 10, wherein the recognizing of the touch object comprises recognizing the touch object as the stylus pen when the effective signal is a signal corresponding to a resonance signal of the stylus pen.

12. The touch detection method of the touch apparatus of claim 9, further comprising, while opening in the idle mode, determining a type of a touch object that generated the touch input from a detection signal received from the touch sensor during the idle mode.

13. The touch detection method of the touch apparatus of claim 12, wherein the determining of the type of the touch object comprises determining the touch object as the stylus pen when the detection signal received from the touch sensor during the idle mode includes a signal component that corresponds to a resonance signal of the stylus pen.

14. The touch detection method of claim 9, wherein a frequency of the first driving signal corresponds to a resonance frequency of the stylus pen.

15. The touch detection method of the touch apparatus of claim 14, further comprising:
   operating in a normal driving mode during which a second driving signal of which a frequency is different from the frequency of the first driving signal is output to the touch sensor; and
   obtaining second touch coordinate information by using a detection signal input from the touch sensor during the normal driving mode.

16. The touch detection method of the touch apparatus of claim 15, wherein the first driving signal in the resonance driving mode has a different frequency from a frequency of the second driving signal in the normal driving mode.

17. A touch apparatus comprising:
   a touch sensor that includes a plurality of first touch electrodes for obtaining a coordinate value in a first coordinate axis, and a plurality of second touch electrodes for obtaining a coordinate value in a second coordinate axis that perpendicularly crosses the first coordinate axis; and
   a touch controller that operates in a driving mode during which a driving signal for generation of a resonance signal of a stylus pen is output, and an idle mode during which the outputting of the driving signal is stopped, and obtains touch coordinate information from a detection signal input from the touch sensor during a driving mode section during which the touch controller operates in the driving mode,
   wherein the touch controller simultaneously outputs the driving signal to the plurality of first touch electrodes during a first driving mode section and simultaneously outputs the driving signal to the plurality of second touch electrodes during a second driving mode section, which is a next driving mode section of the first driving mode section, and
   obtains the touch coordinate information by using a detection signal input from at least one type of touch electrodes among the plurality of first touch electrodes and the plurality of second touch electrodes during the first and second driving mode sections.

18. The touch apparatus of claim 17, wherein the touch controller obtains a coordinate value in the second coordinate axis among the touch coordinate information by using detection signals input from the plurality of second touch electrodes during the first driving mode section, and
   obtains a coordinate value in the first coordinate axis among the touch coordinate information by using detection signals input from the plurality of first touch electrodes during the second driving mode section.

19. The touch apparatus of claim 17, wherein the touch controller obtains a coordinate value in the first coordinate axis among the touch coordinate information by using detection signals input from the plurality of first touch electrodes during the first driving mode section, and
   obtains a coordinate value in the second coordinate axis among the touch coordinate information by using detection signals input from the plurality of second touch electrodes during the second driving mode section.

20. The touch apparatus of claim 17, wherein the touch controller determines a type of a touch object that generated the touch input by using a detection signal received from the touch sensor during an idle mode section during which the touch controller operates in the idle mode.

21. A touch apparatus comprising:
   a touch sensor that includes a plurality of first touch electrodes for obtaining a coordinate value in a first coordinate axis, and a plurality of second touch electrodes for obtaining a coordinate value in a second coordinate axis that perpendicularly crosses the first coordinate axis; and
   a touch controller that operates in a driving mode during which a driving signal for generation of a resonance signal of a stylus pen is output, and an idle mode during which the outputting of the driving signal is stopped, and obtains touch coordinate information from a detection signal input from the touch sensor during a driving mode section during which the touch controller operates in the driving mode, wherein the touch controller simultaneously outputs the driving signal to the plurality of first and second touch electrodes, and obtains the touch coordinate information by using a detection signal input from at least one type of touch electrode among the plurality of first touch electrodes and the plurality of second touch electrodes during the driving mode.

22. The touch apparatus of claim 21, wherein the touch controller obtains a coordinate value in the second coordinate axis among the touch coordinate information by using detection signals received from the plurality of second touch electrodes, and obtains a coordinate value in the first coordinate axis among the touch coordinate information by using detection signals input from the plurality of first touch electrodes during the driving mode section.

23. The touch apparatus of claim 21, wherein the touch controller obtains a coordinate value in the first coordinate axis among the touch coordinate information by using detection signals input from the plurality of first touch electrodes during the first driving mode section, and
obtains a coordinate value in the second coordinate axis among the touch coordinate information by using detection signals input from the plurality of second touch electrodes during a second driving mode section, which is a driving mode section next to the first driving mode section.

24. The touch apparatus of claim 21, wherein the touch controller simultaneously outputs the driving signal to the plurality of first touch electrodes during the driving mode section and obtains a coordinate value in the second coordinate axis among the touch coordinate information by using detection signals input from the plurality of second touch electrodes during the driving mode, and
obtains a coordinate value in the first coordinate axis among the touch coordinate information by using detection signals input from the plurality of first touch electrodes for an idle mode section during which the touch controller operations in the idle mode, which is consecutive to the driving mode section.

25. A touch detection method of a touch apparatus that includes a plurality of first electrodes for obtaining a coordinate value in a first coordinate axis and a plurality of second electrodes for obtaining a coordinate value in a second coordinate axis that perpendicularly crosses the first coordinate axis, comprising:
entering a first driving mode section, and simultaneously outputting a driving signal for generation of a resonance signal of a stylus pen to the plurality of first electrodes;
obtaining a first coordinate value that constitutes touch coordinate information by using a detection signal input from at least one type of electrode among the plurality of first electrodes and the plurality of second electrodes during the first driving mode section;
entering a second driving mode section, and simultaneously outputting the driving signal to the plurality of second electrodes; and
obtaining a second coordinate value that constitutes the touch coordinate information by using a detection signal input from the plurality of first electrodes and/or the plurality of second electrodes during the second driving mode section.

26. The touch detection method of claim 25, wherein the obtaining the first coordinate value comprises obtaining the first coordinate value in the second coordinate axis among the touch coordinate information by using detection signals input from the plurality of second electrodes, and
the obtaining the second coordinate value comprises obtaining the second coordinate value in the first coordinate axis among the touch coordinate information by using detection signals input from the plurality of first electrodes.

27. The touch detection method of claim 25, wherein the obtaining the first coordinate value comprises obtaining the first coordinate value in the first coordinate axis among the touch coordinate information by using detection signals input from the plurality of first electrodes, and
the obtaining the second coordinate value comprises obtaining the second coordinate value in the second coordinate axis among the touch coordinate information by using detection signals input from the plurality of second electrodes.

28. The touch detection method of claim 25, further comprising:
when entering an idle mode section after termination of the first driving mode section, disabling outputting of the driving signal; and
determining a type of a touch object that generated the touch input by using a detection signal received from the plurality of first electrodes or the plurality of second electrodes during the idle mode section.

29. A touch detection method of a touch apparatus provided with a touch sensor that includes a plurality of first electrodes for obtaining a coordinate value in a first coordinate axis, and a plurality of second electrodes for obtaining a coordinate value in a second coordinate axis that perpendicularly crosses the first coordinate axis, comprising:
entering a driving mode section, and simultaneously outputting a driving signal for generation of a resonance signal of a stylus pen to the plurality of first and second electrode; and
obtaining the touch coordinate information by using a detection signal input from at least one type of electrode among the plurality of first electrodes and the plurality of second electrodes during the driving mode section.

30. The touch detection device of claim 29, wherein the obtaining the touch coordinate information comprises:
obtaining a coordinate value in the second coordinate axis among the touch coordinate information by using detection signals received from the plurality of second electrodes during the driving mode section; and
obtaining a coordinate value in the first coordinate axis among the touch coordinate information by using detection signals received from the plurality of first electrodes during the driving mode section.

31. The touch detection method of claim 29, wherein the obtaining the touch coordinate information comprises:
obtaining a coordinate value in the first coordinate axis among the touch coordinate information by using detection signals received from the plurality of first electrodes when the driving mode section is a first driving mode section; and
obtaining a coordinate value in the second coordinate axis among the touch coordinate information by using detection signals received from the plurality of second electrodes when the driving mode section is a second driving mode section.

32. The touch detection method of claim 29, further comprising:
when entering an idle mode section after termination of the driving mode section, disabling outputting of the driving signal; and determining a type of a touch object that generated the touch input by using a detection signal received from the plurality of first electrodes or the plurality of second electrodes during the idle mode section.

\* \* \* \* \*